(12) United States Patent
Mäder

(10) Patent No.: US 9,376,259 B2
(45) Date of Patent: Jun. 28, 2016

(54) GRIPPER, A CONVEYING INSTALLATION AND A METHOD FOR THE OPERATION OF SUCH A CONVEYING INSTALLATION

(71) Applicant: FERAG AG, Hinwil (CH)

(72) Inventor: Carl Conrad Mäder, Hittnau (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 14/416,101

(22) PCT Filed: Jul. 17, 2013

(86) PCT No.: PCT/CH2013/000133
§ 371 (c)(1),
(2) Date: Jan. 21, 2015

(87) PCT Pub. No.: WO2014/015445
PCT Pub. Date: Jan. 30, 2014

(65) Prior Publication Data
US 2015/0151918 A1    Jun. 4, 2015

(30) Foreign Application Priority Data

Jul. 23, 2012  (CH) ...................................... 1110/12

(51) Int. Cl.
*B65G 47/00* (2006.01)
*B65G 17/32* (2006.01)
*B65G 47/86* (2006.01)
(Continued)

(52) U.S. Cl.
CPC .......... *B65G 17/323* (2013.01); *B29C 49/4205* (2013.01); *B65G 17/326* (2013.01); *B65G 47/842* (2013.01); *B65G 47/90* (2013.01); *B65G 2201/0235* (2013.01)

(58) Field of Classification Search
CPC ............... B65G 47/847; B65G 17/323; B65G 2201/0244; B65G 2201/0247
USPC ............................................ 198/468.2, 470.1
See application file for complete search history.

(56) References Cited

U.S. PATENT DOCUMENTS 1,861,282 A * 5/1932 Nelson .................... D06F 53/02
                                                       198/803.8
2,213,774 A   9/1940 Taylor
(Continued)

FOREIGN PATENT DOCUMENTS

DE   296 02 798    9/1996
DE   195 42 337    5/1997
(Continued)

*Primary Examiner* — James R Bidwell
(74) *Attorney, Agent, or Firm* — Rankin, Hill & Clark LLP

(57) ABSTRACT

A gripper for gripping and held conveying of objects as well as a corresponding conveying installation. The gripper has a first gripper jaw and a second gripper jaw. The gripper jaws can assume an open and a closed condition relative to one another, can exert a clamping force onto the object to be gripped, and a restoring force in the direction of the closed condition acts upon the gripper jaws. Moreover, at least one control element is present, which is capable of interacting with a switch. The control element is designed as a cam guide and has a functional contour with at least one arcuate contour segment. The conveying installation with opening locations that include a switch of a first and second type and control elements that either interact with the switch of the first type or the switch of the second type.

14 Claims, 22 Drawing Sheets

(51) Int. Cl.
  *B65G 47/90* (2006.01)
  *B29C 49/42* (2006.01)

(56) References Cited

U.S. PATENT DOCUMENTS

| | | | | |
|---|---|---|---|---|
| 4,313,534 | A | * | 2/1982 | Suzuki ................. B29C 49/421 198/465.1 |
| 4,921,294 | A | | 5/1990 | Klopfenstein |
| 5,094,336 | A | * | 3/1992 | Lundstrom ............. B41J 3/387 198/341.08 |
| 5,261,520 | A | * | 11/1993 | Duke ...................... B42C 19/08 198/375 |
| 6,435,336 | B1 | * | 8/2002 | Knodler ............... B21D 43/055 198/468.2 |
| 6,612,634 | B1 | | 9/2003 | Zoppas |
| 6,631,898 | B2 | * | 10/2003 | Dobrindt ................ B65H 29/10 198/468.2 |
| 7,055,677 | B2 | * | 6/2006 | Hartness .............. B65G 17/323 198/468.2 |
| 7,207,434 | B2 | * | 4/2007 | Hartness .............. B65G 17/323 198/468.2 |
| 2010/0278959 | A1 | | 11/2010 | Linke et al. |

FOREIGN PATENT DOCUMENTS

| | | |
|---|---|---|
| DE | 100 59 951 | 6/2002 |
| DE | 103 25 693 | 7/2004 |
| EP | 0 577 569 | 1/1994 |
| EP | 1 864 942 | 12/2007 |
| WO | 2011/001356 | 1/2011 |

\* cited by examiner

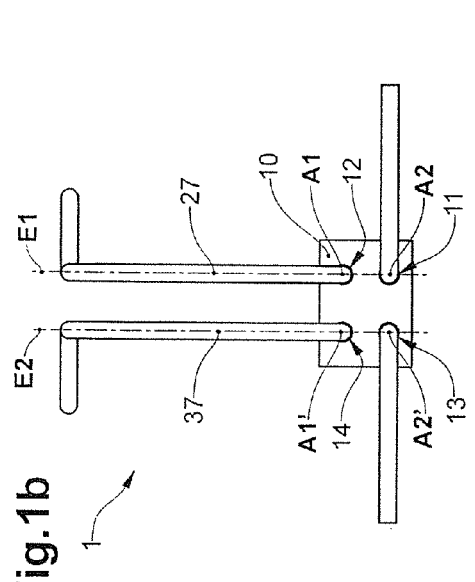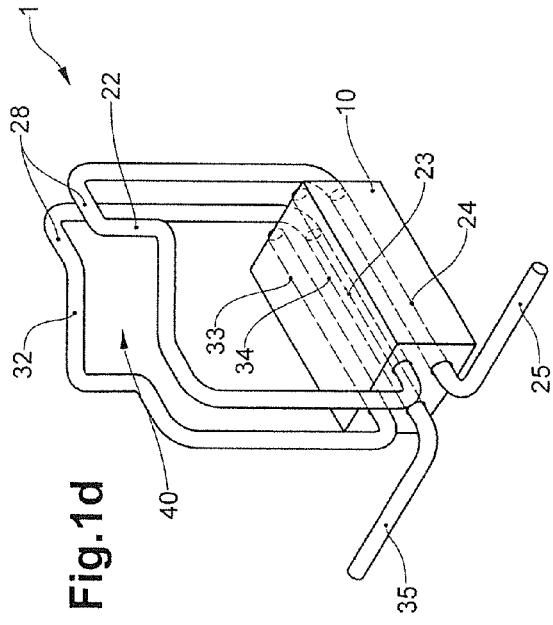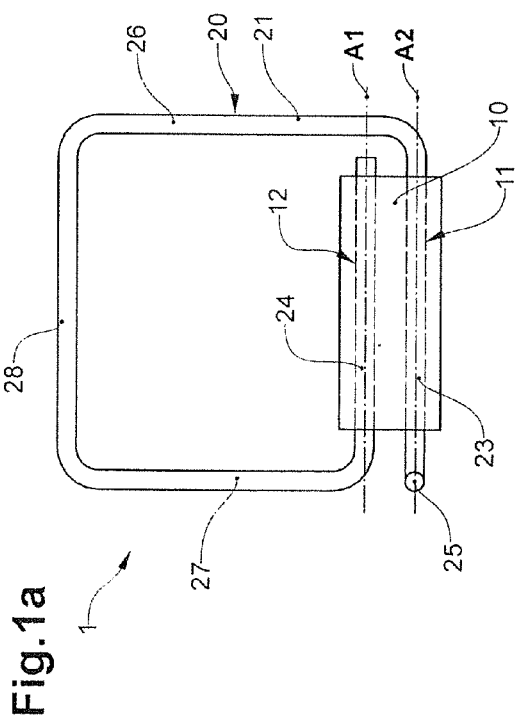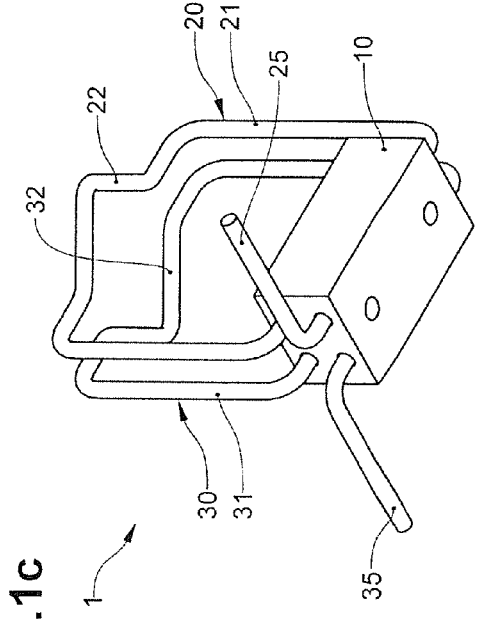

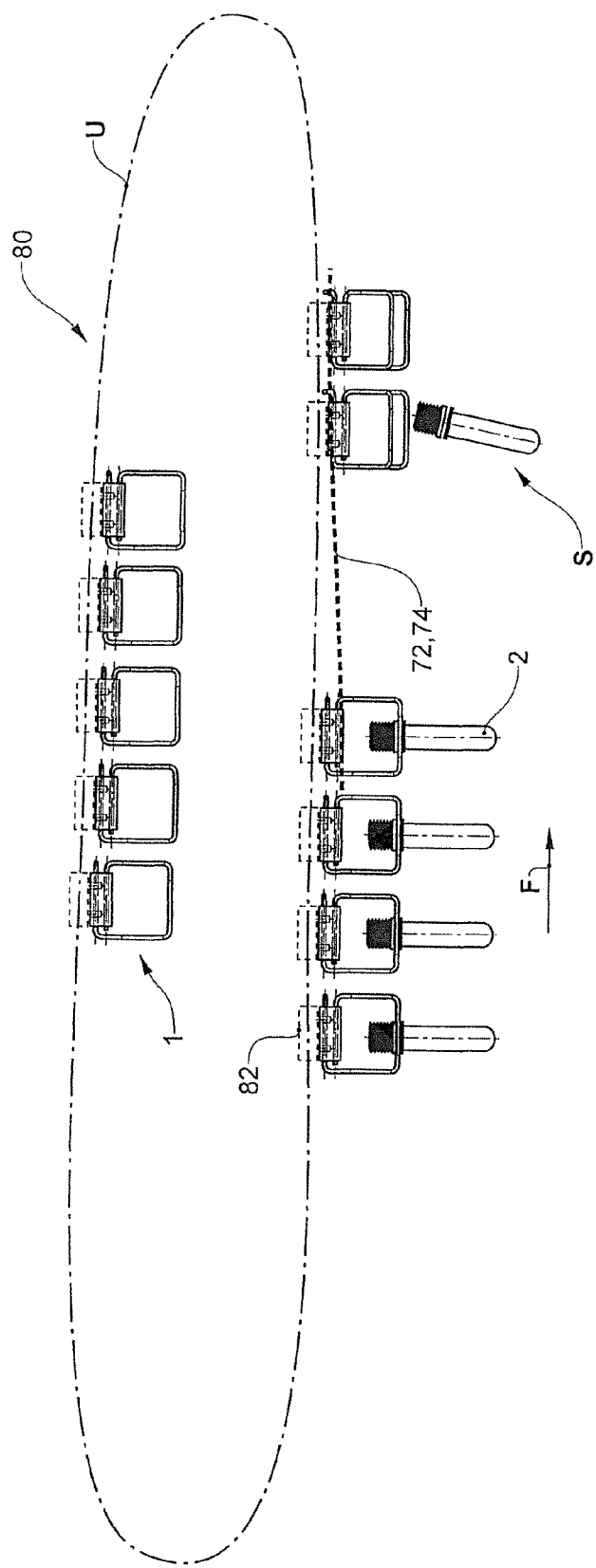

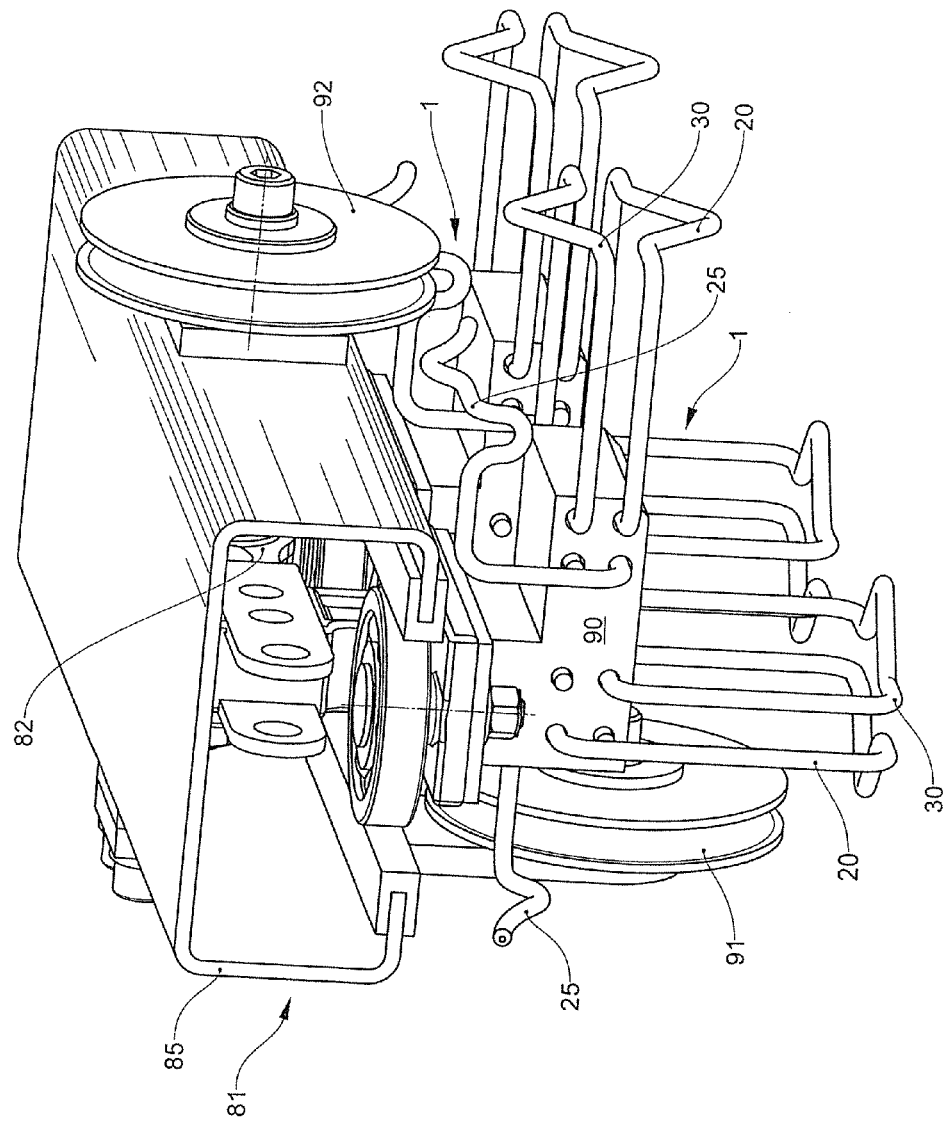

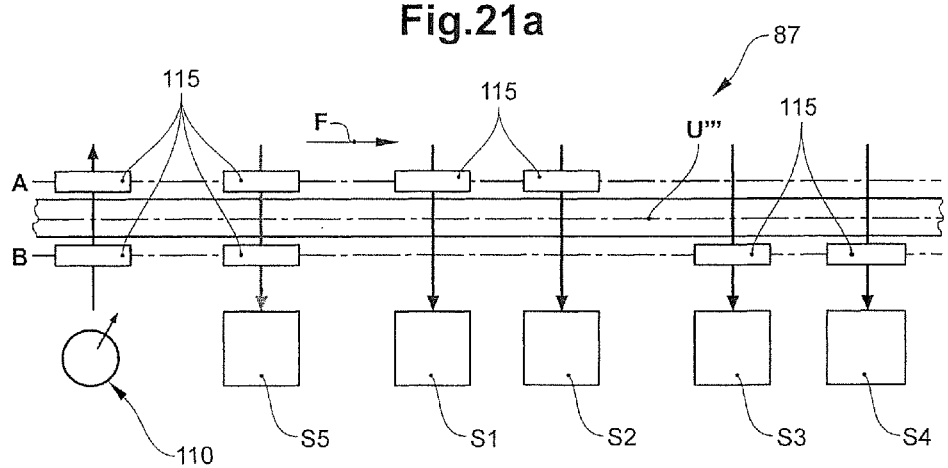
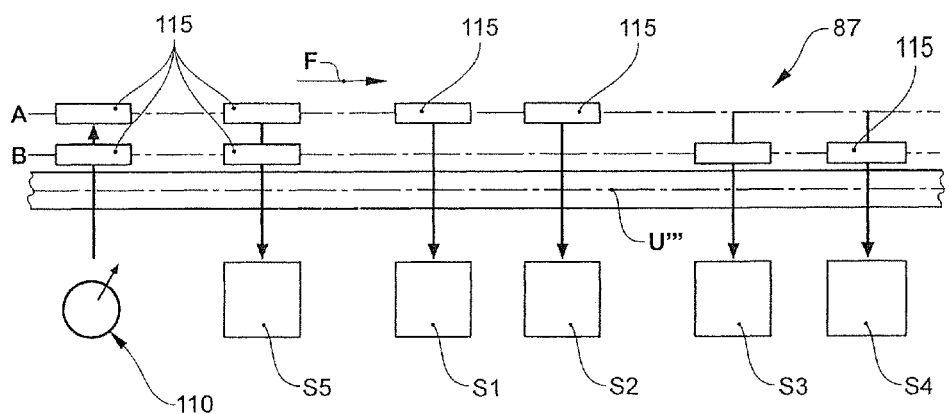
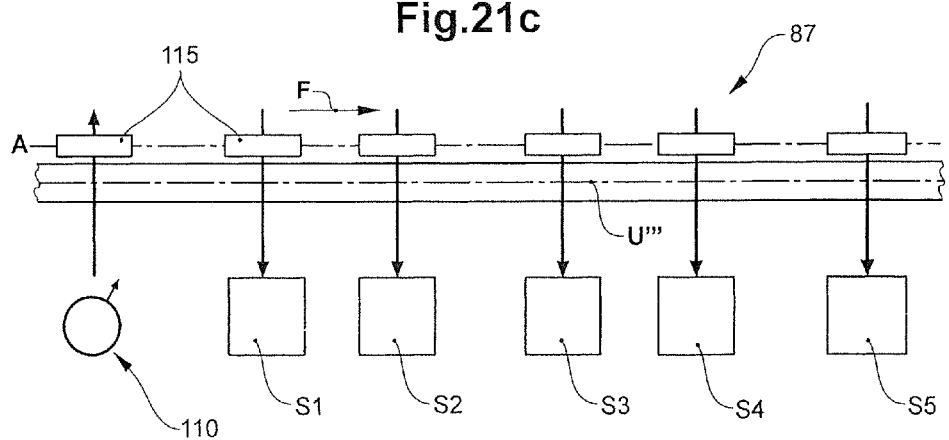

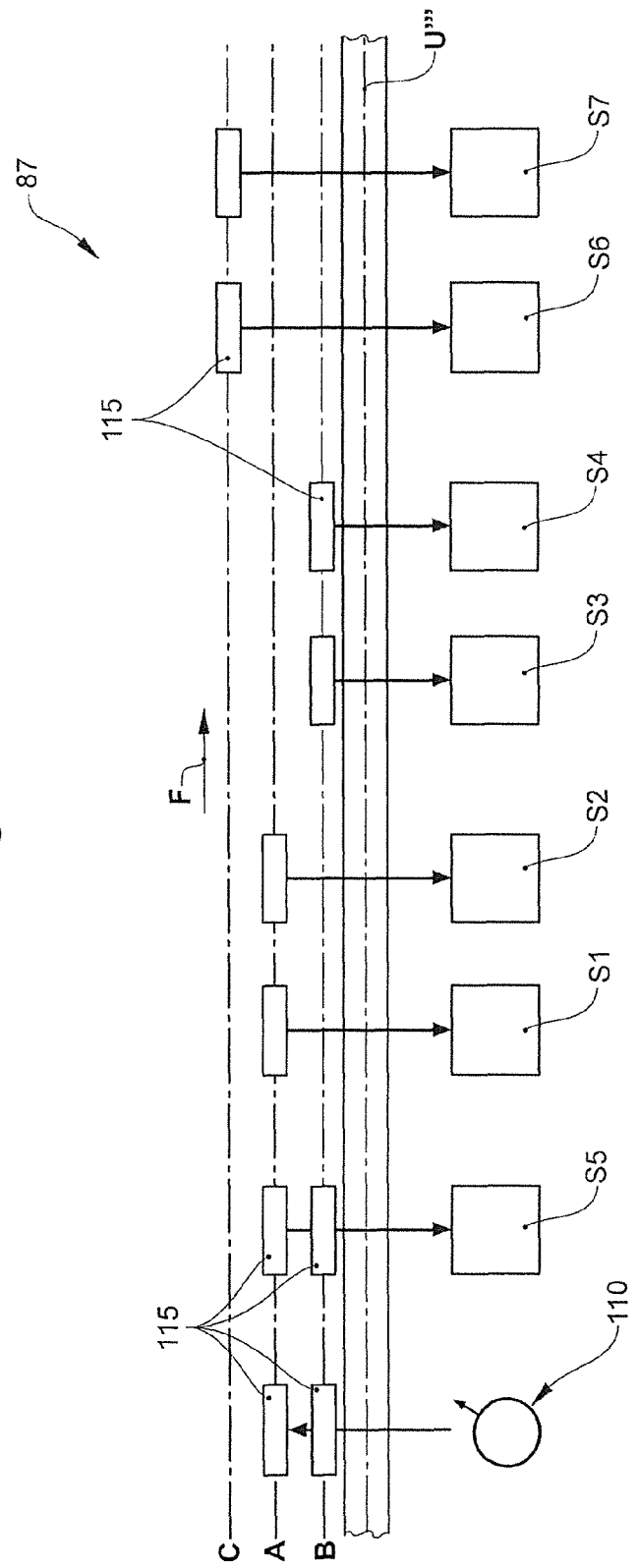

GRIPPER, A CONVEYING INSTALLATION AND A METHOD FOR THE OPERATION OF SUCH A CONVEYING INSTALLATION

BACKGROUND OF THE INVENTION

1. Field of the Invention

The invention lies in the field of conveying technology, and generally relates to a gripper for gripping and for the held conveying of objects, wherein the gripper includes a control element for actuating the gripper. The invention, moreover, relates to a conveying installation with a plurality of grippers with control elements for actuating the grippers.

2. Description of Related Art

Different examples of a gripper particularly suitable for gripping and conveying spatially extended, symmetrical objects, objects with a holding ring, hollow objects, and objects with different shapes and/or sizes are described in the following sections for a better illustration of the invention. The gripper in particular is suitable for gripping and conveying preforms for the production of receptacles of plastic, e.g. PET bottles.

Such grippers, for example, are applied, in order to convey preforms for blow moulding of containers of plastic and the manufactured containers, between different stations of a blow moulding installation. The preforms are hollow bodies of a thermoplastic plastic with an essentially rotationally symmetrical shape that are open at one side. As a rule, they include a thread and a holding ring.

Known grippers for preforms are designed in the manner of a pincer. The gripper jaws are arranged in a plane that lies perpendicularly to the rotation axis of the preform. They engage below the holding ring in the manner of a fork, by way of approaching them from the side. Conveying devices with such grippers therefore require relatively much space in the receiving region. The gripper jaws, in the region, in which these grip the object (clamping region) have a concave shape and are thus adapted to the cylinder-like shape below the holding ring. Objects with different diameters, however, can thus only be gripped within a certain maximal and minimal diameter. Examples for known preform grippers are described in US 2010/0278959, U.S. Pat. No. 6,612,634 or DE 10325693. Clamping mandrels are alternatively applied and these can be inserted into a mouth region of the preform for holding.

A gripper for gripping flat products, in particular printed products, and which includes a gripping body, a stationary and a moving gripper jaw is known from U.S. Pat. No. 4,921,294. The construction is mirror-symmetrical. The movable gripper jaw is formed by a mirror-symmetrical wire bow of spring steel. The wire bow in its end regions is shaped in each case into a helix. Moreover, it forms two holding tongues, departing from the helices. These holding tongues are orientated perpendicularly to the axis of the helices and are spaced from one another. The bow between the holding tongues is bent such that it forms an elongate, straight bow part that is located in the proximity of the common axis of the helices and acts as a pressing element. The helices are stuck onto pivots that are arranged on the gripper body at sides lying opposite to one another and that are aligned with one another. The wire body is biased against the stationary gripper jaw by way of the helices being fixed in the gripper body. A pivot axis is defined by the pivot, about which the gripper jaw can rotate. The gripper jaw is actuated by two control elements that each press onto the wire bow in the region of the holding tongue. These control elements press the movable gripper jaw away from the fixed gripper jaw when they are commonly actuated. For this, they are biased towards the moveable gripper jaw.

This design, due to the shaping of the bow with two projecting tongues and an elongate pressing element is adapted to flat objects and is not suitable for conveying spatially extended objects with a different shape. The actuation mechanism consists of several parts and is therefore complicated to manufacture and maintain.

The grippers, which are mentioned hereinafter as examples, serve for a better illustration of the invention and are designed according to a patent application of the same applicant that is not yet published. The grippers provide a conveying device and an operating method, with which device or method the disadvantages mentioned above are avoided. The gripper in particular is suitable for reliably gripping and conveying spatially extended objects with a different shape, e.g. preforms. The gripper is simple and inexpensive to manufacture and is robust as possible.

SUMMARY OF THE INVENTION

A gripper, a conveying installation with such grippers, and an operating method for such a conveying installation are described hereinafter. Thereby, different, advantageous further developments of the invention are described in the description and in the drawings.

The gripper includes a gripper body, a first gripper jaw and a second gripper jaw. The gripper jaws each include at least one clamping region, in which they interact with the object in the case of application. They can assume an open and a closed condition relative to one another and exert a clamping force onto the object to be gripped, for holding.

At least one control element is present and is capable of interacting with a switch, and at least indirectly acts on one of the gripper jaws, in order to move the one gripper jaw.

At least one of the gripper jaws has a jaw body that is elastically deformable and is mounted on the gripper body such that the jaw body assumes a defined, spatial position without a force action upon the control element, and elastically deforms given the application of a force onto the control element.

The jaw body by way of a suitable mounting in the gripper body is preferably not only deformed along a line, but over its whole extension. The gripper jaw is deflected out of the defined position by way of the elastic deformation, and the gripper opens or closes. The gripper holds the object with a positive fit, non-positive fit and/or friction fit.

The jaw body is preferably mounted on the gripper body at least at three points which do not lie along a common axis, or at least two different axes.

The axes are, for example, parallel or skewed relative to one another.

By way of this, one succeeds in the gripper jaw being moved relative to the other gripper jaw on actuation of the control element, so that the gripper opens or closes.

The gripper jaw therefore does not carry out an exact pivot movement about an unambiguously defined pivot axis, but a movement that can be approximated by a pivot movement about an axis (hereinafter: movement about an approximate pivot axis).

The jaw body is twisted (torsion) at least in individual sections under loading, for example, when a torque is transmitted onto the jaw body by the control element.

The jaw body cannot carry out a purely torsional movement due to the mounting along two axes or on at least three points (described above), but is loaded in bending at least in regions. Relatively large elastic energies can thereby be stored in a simple mechanical element, e.g. an asymmetrical, loop-like wire bow. These lead to large restoring forces even with this very simple design, and thus to a good holding effect.

The asymmetrical mounting and the single-sided actuation leads to the fact that the wire bow opens in a non-uniform manner seen transversely to the approximate pivot axis, i.e. at the side of the control element more than at the side distanced to the control element. This effect can be utilised if objects are to be received or picked up in the direction of the approximate pivot axis, by way of the gripper approaching the object, leading with the side which is opened somewhat more.

The jaw body preferably includes an elastically deformable material, in particular a spring steel, and can be designed in a single-part or multi-part manner and consist of one or more materials.

Preferably, the jaw body is a bow of a wire-like or tubular material, e.g. of metal or plastic, with a round, rectangular, square or a differently shaped cross section. "Wire-like or tubular" indicate elements (hereinafter simply mentioned as "wire bow"), whose length in the extended condition is a multiple larger than their thickness or their diameter. Such a gripper jaw is simple and inexpensive in manufacture.

The functions that are important for the grippers, such as the mounting in the gripper body, the elastic deformation on opening or closure, and the fixed holding/clamping of objects are realised by the wire bow in a common component.

The wire bow can also consist of several connected parts for simplifying the manufacture thereof.

The diameter or the thickness of the wire material is selected such that the jaw body is adequately stable for holding the desired objects and is adequately elastic for opening and closure by way of elastic deformation.

Typically, the diameter of the wire material lies in the range of 1 to 20 mm, preferably 3 to 8 mm. In particular, the diameter of the wire material lies in the range of 1 to 10 mm, preferably 1.1 to 3.5 mm.

Preferably, the bow has the shape of a loop which lies essentially in a plane.

The ends of the loop are preferably located in spatial proximity to one another.

A part of the bow is shaped such that it forms a clamping region. The clamping region is preferably shaped such that a receiver of a defined minimum size is formed in the closed condition together with the further gripper jaw.

The clamping region for this preferably projects in an arched manner out of the plane of the loop and has a contour, in particular a semicircular, triangular or polygonal contour, which tapers with an increasing distance to the plane.

The tapering shape serves for the secure receiving of objects with different sizes and shapes. The objects force the gripper into a differently wide opening of the gripper jaws, but are securely held independently of the opening degree, since the clamping region presses onto the object from several sides due to the outwardly tapering contour.

As an alternative to the tapering contour or additionally thereto, the clamping region can include elastically deformable clamping elements with a greater elasticity than the jaw bodies which hold the object on receiving from several sides.

The clamping element, for example, is an elastic element such as a rubber strip or a helical spring that is positioned within the clamping region and, as the case may be, is spanned between the wire bow, which is bent there in a projecting manner. The application spectrum of the gripper is increased further if these clamping elements are exchangeable, thus different elasticities and clamping forces can be realised depending on the demands.

The bow includes at least two fastening sections that are spaced from one another and with which it is mounted in or on bearing/mounting regions of the gripper body.

The bearing regions and thus the fastening sections are aligned in the gripper body, preferably along different axes which preferably run parallel.

The bearing regions, for example, are holes and/or continuous recesses in the gripper body, into which the end regions of the bow can be inserted and the bow can thus be clamped in.

The clamping region in particular is located between the fastening sections seen along the wire. Due to this mounting, one succeeds in the bow deforming essentially along its complete extension when it is deflected at a location by way of a local force action. The gripper therefore opens or closes, even if a force is only exerted in a pointwise manner at one location.

The design of the control element that interacts with external switch is particularly simple with the bow described above. The bow for this, preferably in an end region, includes an actuation section that is capable of interacting directly with a mechanical switch or serves as a carrier of a cam roller which, for its part, rolls on the switch.

The actuation section for this is preferably bent away relative to the adjacent fastening section and preferably points in a direction that is perpendicular to the approximate pivot axis of the gripper jaw. A torque can be transmitted particularly well onto the bow by way of the thus formed lever.

Alternatively to the bow shape, the jaw body can also be a flat element that is elastically deformable per se, such as a spring steel plate, which is clamped in the gripper body and forms a suitably shaped clamping region.

The gripper preferably has two gripper jaws that are designed essentially constructionally identically and are individually controllable.

The gripper jaws are arranged mirror-symmetrically or axis-symmetrically to one another on the gripper body.

The direction, in which the gripped objects are delivered or released, can be influenced by the targeted opening of the one or other gripper jaw or the common movement of both gripper jaws, in particular if the gripper body, seen in the direction of gravity, is located below the object on release of the object. The complete installation obtains a new degree of freedom due to the directed release (delivery), despite an exceptionally simple design of the grippers.

The control elements for both gripper jaws are preferably located at different sides of the gripper body, which simplifies the arrangement of the respective switch.

The grippers on operation can be located above, below or next to the received objects.

The objects are gripped from above or below or by way of the grippers approaching the object, laterally along the direction of the approximate pivot axis.

The gripper jaws, for example, assume the following positions without the force effect on the control element: lying on one another (also with bias) in the clamping region, at a small distance in the clamping region; with a maximal opening distance in the clamping region. The gripper jaws in the first two cases are activated to open and encompass objects from the outside. In the last case, the gripper jaws are activated to close and grip the objects, by way of them moving into a recess in the object in the closed condition and firmly clamping this from the inside.

In a further advantageous design, the gripper is self-opening: one or both gripper jaws are opened when an object presses laterally, i.e. in the direction of the approximate pivot axis, against the gripper jaws.

The gripper jaws are deflected such that the object can be inserted between them. The gripper jaws due to their elasticity move to one another again as soon as the object is located in the receiver and embrace the object in a clamping manner.

The gripper jaws for this preferably include further actuation elements or are coupled to such elements. The further actuation elements are shaped such that the gripper jaws yield outwards when an object is moved against the actuation elements in the direction of the approximate pivot axis, which as a rule also corresponds to the conveying direction.

The gripper as an optional feature includes at least two first gripper jaws and at least two second gripper jaws.

Thereby, each first gripper jaw can assume an open and a closed condition relative to at least one second gripper jaw and exert a clamping force onto the object to be gripped and/or conversely also each second gripper jaws can assume an open and a closed condition relative to at least one first gripper jaw and exert a clamping force onto the object to be gripped.

This, for example, means that each first gripper jaw is designed and arranged in a manner such that it can assume an open and a closed position relative to at least one second gripper jaw and exerts a clamping force onto a gripped object and/or conversely also each second gripper jaw is designed and arranged such that it can assume an open and a closed condition relative to at least one first gripper jaw and exerts a clamping force onto a gripped object.

Simultaneously, several objects can be gripped per gripper by way of a plurality of first and second gripper jaws.

This results in an increase in the conveying capacity of the grippers and/or other advantages with regard to method technology, such as the possibility of a use independently of one another and/or a charging of the several first and second gripper jaws with different objects, the charging being different to one another, and/or a simultaneous conveying of different objects over spatially and/or temporally different distances.

Optionally, in each case a gripper jaw can assume an open and/or a closed condition relative to several other gripper jaws and exert a clamping force on the object to be gripped or on the objects to be gripped.

With regard to a gripper with at least two first and at least two second gripper jaws, as a further optional feature, each first gripper jaw can assume an open and a closed condition relative to a single, second gripper jaw, and exert a clamping force onto the object to be gripped, and simultaneously also each second gripper jaw can assume an open and a closed condition relative to a single, first gripper jaw and exert a clamping force onto the object to be gripped.

In this case, assuming a gripper with a plurality of gripper jaws, thus each individual gripper jaw includes one single further gripper jaw, with respect to which it can assume and open and a closed condition and with which it exerts a clamping force onto the object to be gripped.

The gripper thus has at least two separate gripper jaw pairs.

A gripper jaw pair throughout the application is to be understood as an arrangement of two gripper jaws that can interact with one another. The gripper jaws of a gripper jaw pair can thereby be designed the same or differently. In particular, a gripper jaw pair at least temporarily can grip at least one object by way of applying a clamping force A plurality of gripper jaw pairs permits a comprehensive or varied application of the gripper and increases the conveying capacity of the gripper. The advantages of a plurality of gripper jaws, which are mentioned further above, also apply to a gripper with a plurality of gripper jaw pairs.

Alternatively, gripper jaws of a different number can also interact with one another (thus assume an open and a closed condition relative to one another and exert a clamping force onto the object to be gripped).

For example, two or also more first gripper jaws can interact with only one second gripper jaw. Conversely, a first gripper jaw for example can also interact with two or more second gripper jaws. That regarding the first gripper jaws applies to the second gripper jaws.

As a further optional feature, a gripper, with which several first gripper jaws are deflected by a common control element and/or several second gripper jaws are deflected by a common, different control element, includes a number of control elements that is greater or equal to the number of first gripper jaws and/or greater or equal to the number of second gripper jaws.

A number of control elements, which is at least equally large or larger than the number of first and/or second gripper jaws, permits a flexible control of individual gripper jaws and increases the flexibility and the versatility of the application possibilities of the gripper.

Alternatively, one can also use a smaller number of control elements. Thereby, several gripper jaws can be controlled by a single control element and/or gripper jaws are not controlled via control elements at all, but are operated in a self-opening manner, for example.

In one gripper, a first gripper jaw pair in the closed condition is at an angle of 40 to 140 degrees, in particular of 60 to 120 degrees and in particular of 80 to 100 degrees to a second gripper jaw pair, as a further optional feature. Thereby, one gripper jaw pair includes a first gripper jaw and a second gripper jaw that can exert a clamping force onto the object to be gripped.

In other words, a gripper jaw pair includes a first gripper jaw and a second gripper jaw that are designed and configured such that they exert a clamping force onto the object to be gripped.

The gripper jaws of a gripper jaw pair interact with one another. A first and a second gripper jaw pair are at an angle of 40 to 140 degrees to one another in the closed condition. The angle in particular can be 60 to 120 degrees. The angle in particular can be 80 to 100 degrees. In particular, the first and the second gripper jaw pair are at right angles to one another. The angle between the gripper jaw pairs in the closed condition, for example, corresponds to the angle between longitudinal middle axes of objects that are gripped by these gripper jaw pairs.

An arrangement of gripper jaw pairs that is angled to one another (in the closed condition) permits a simple and rapid access to the grippers from different spatial directions. This can simplify a gripping and/or release of objects by the gripper. The application possibilities of the gripper are likewise increased by way of this. Alternatively, the gripper jaw pairs can also however be at angles smaller than 40 degrees and/or greater than 140 degrees to one another. In particular, the gripper jaw pairs can also be parallel to one another.

The examples of grippers that have been lastly described in the preceding paragraphs for an improved illustration of the invention include control elements in the form of straight actuation sections, for opening the gripper. These grippers open and/or close by way of an essentially uniform movement of the gripper jaws, wherein the speed of the gripper jaws is essentially constant. This has the disadvantage that the movement of the gripper jaws is not adapted to different phases of the gripping and/or release of the object.

Thus, for example when gripping an object, it is advantageous if a first phase of a closure movement of the gripper jaws, thus the phase before contact closure of the gripper jaws with the object, is effected in a short time and due to this with a higher speed of the gripper jaws. A high cycle frequency and a rapid processing of the objects are achieved by this. This, however, has the disadvantage that a second phase of the closure movement, thus the phase after contact closure of the gripper jaws with the object is likewise effected in a short time and on account of this with a high speed of the gripper jaws. This for example can load or burden the object and/or the gripper jaw, can cause damage and/or wear and/or not permit the gripper jaws to securely grip a resilient object.

Analogously, with a release of the object, a second phase of this release (thus an opening movement of the gripper jaws without contact closure of the gripper jaws with the object) can advantageously be effected in a short time. This, however, can again have a negative effect since a first phase of the release (thus when the gripper jaws are still in contact closure with the object) is likewise effected in a short time on account of this. This can likewise burden or load, for example, the object and/or the gripper jaw, cause damage and/or wear and/or permit the gripper jaws to release the object in an uncontrolled manner.

Conversely, the second phase of the gripping can advantageously be effected slowly and, on account of this, be effected at a lower speed of the gripper jaws, so that the object and/or the gripper jaw is treated gently, no damage and/or wear arises and/or a compliant object can be securely gripped (for example, because the compliant object only slowly deforms into a secure holding configuration). In contrast, the first phase of the gripping is also effected slowly due to this, which is unnecessary, slows down the complete process of gripping as well as also of procedures linked to this, and by way of this keeps the efficiency of the device low and possibly even limits it. Analogously to this, a first phase of the release of the object, which is advantageously effected slowly, can have a negative effected due to a second phase of the release likewise being effected slowly and causing the same disadvantages mentioned above.

The grippers described in the first paragraphs, for example, include no control element, since the grippers on contact with the object explicitly (U.S. Pat. No. 6,612,634) or implicity (DE 10325693) open and close by themselves due to a suitable movement of the object. The gripper described in U.S. Pat. No. 4,921,294, as a control element includes wheels that run over stationary guides (not represented in the drawing) and open the gripper in this manner. Wheels as control elements on the gripper have the disadvantage that these are technically cumbersome due to a necessary freely rotatable fastening and are complicated, prone to failure and expensive. A stationary cam guide interacting with these wheels is also subjected to a high wear. The grippers described in US 2010/0278959 as a control element include a cam-like holding element that can optionally be moved by a cam control that is not described in more detail. The cam-like holding element just as the corresponding cam control is subjected to high wear and a targeted variation of the movement of the gripper bows is only possible to a limited extent and is not technically simple to realise.

For this reason, in a first aspect, in conveying technology there exists the need for grippers that are simple and inexpensive in manufacture, are robust and that can grip, convey and/or release the objects again, in a controlled, rapid, gentle and reliable manner. Thereby, it is particularly with high processing speeds and/or processing quantities that a low-wear design of the grippers is a necessity.

Most of the conveying devices that are described further above cannot release conveyed objects at different locations of the same circulating path in a targeted manner, and in particular not in a manner depending on their sort. The conveying device described in DE 10325693 although conveying objects of different sorts, however conveys these on different circulating paths and for this uses technically complicated, cumbersome and expensive devices. It is possible to release objects in different directions in a targeted manner with the grippers described in the first paragraphs, however each gripper jaw must have a control element for this. Moreover, the opening locations must be arranged in accordance with the release direction. The opening locations, moreover, must also actively activate the release of the objects at this location by way of a control, in order to achieve a sorting. An active control is cumbersome, expensive and prone to failure.

For this reason, in a second aspect, in conveying technology there exists the need for a conveying device that is simple and inexpensive to manufacture, is robust and that, along the same circulating path, can grip and convey different sorts of objects and release them again in a manner depending on their sort. Thereby, the release in particular can be effected by a targeted opening of the respective grippers at predefined opening locations.

In a third aspect, there is the necessity to improve a conveying installation, in particular with regard to the conveying of different groups of objects of the same sort in each case. Thereby, an increase of the conveying quantity and, on account of this, an increase of the efficiency of a conveying device can be sought after as a further requirement.

It is therefore the object of the invention, to provide control elements and a conveying device with grippers, with which control elements or device the disadvantages of the state of the art that are mentioned above are at least partly avoided.

With regard to the first aspect, this object is at least partly achieved by a gripper for the gripping and held conveying of objects. This gripper includes a first gripper jaw and a second gripper jaw that can assume an open and a closed condition relative to one another. A returning force in the direction of the closed condition acts upon the first gripper jaw and the second gripper jaw. The first gripper jaw and the second gripper jaw can exert a clamping force on the object to be gripped. The gripper includes at least one control element that is designed as a cam guide and that acts upon the first gripper jaw and/or second gripper jaw. The control element is moreover capable of interacting with a switch. The control element has a functional contour with at least one arcuate contour segment.

The part of a contour of a control element that comes directly into contact with a switch during interaction with this switch is indicated as a functional contour of the control element. In other words, the functional contour of the control element is thus the part of the contour of the control element, upon which the switch acts in a direct manner and onto which the switch, for example, directly transmits the force for the elastic deformation of the jaw body.

In particular, the control element is connected to at least one jaw body such manner that a force effect upon the at least one jaw body is effected by way of each force acting upon the control element and vice versa.

Thus, each movement (each displacement, bending, extension, compression and/or rotation) of the control element causes a movement of the jaw body and/or a change of the resulting force which acts upon the jaw body.

The resulting force acting upon the jaw body is thereby the sum of all forces acting upon the jaw body (thus, for example also of a counter-force of a force effected by the jaw body). Thereby, the force effected by the jaw body can, for example, act upon an object to be conveyed, upon another jaw body and/or on upon an abutment or deflection limiter. The object to be conveyed, another jaw body and/or the abutment or deflection limiter can, however, also effect a force upon the jaw body.

Conversely, also each movement of the jaw body causes a movement of the control element and/or a change of the resulting force acting upon the control element. Thereby, the force effected by the control element can act, for example, upon a switch and/or an abutment or a deflection limiter. The switch and/or abutment or deflection limiter can, however, also effect a force upon the jaw body.

In other words, the control element and the jaw body are coupled to one another such that each movement of the one element causes a force effect upon the other element. The force effect thereby acts upon the other element by way of a movement of the other element or by way of a change of the resulting force acting upon the other element.

Optionally, the functional contour of the control element lies essentially in one plane. The functional contour, in particular, thereby lies in a plane that encloses a parallel to the conveying direction.

The control element in the conveying direction can be arranged in a leading and/or trailing manner with respect to the gripper jaw which is deflected by the control element.

A region of the contour that can be described by a mathematical curve with a constant curvature or a regular change of curvature, thus straight lines, circles, segments of circles, spirals (in particular arithmetic, logarithmic and hyperbolic spirals) and segments of these spirals as well as cone sections or cone section segments, is indicated as a contour segment.

The control element is designed as a cam guide. A cam guide has a specific shaping which, by way of the interaction with the switch, ensures a predefined and defined temporal and spatial course of the deflection of the gripper jaws and/or a predefined and defined temporal course of the resulting forces acting upon the gripper jaws. The control element is designed as a cam guide by way of this specific shaping.

The resulting force acting upon the gripper jaws, in particular, changes on applying a clamping force upon the object to be conveyed (thus during the gripping of the object) and/or on releasing a clamping force from the object to be conveyed (thus during the release of the object).

The resulting force acting upon the gripper jaw in particular changes on reaching and/or leaving the closed position of the gripper jaws. Thereby for example, the object to be conveyed and/or an abutment or a deflection limiter can cooperate with the gripper jaw.

Thereby, the predefined and defined temporal and spatial course of the deflection of the gripper jaws for example includes at least one, in particular at least two and in particular at least three changes of speed, acceleration and/or movement directions of the gripper jaws. Each change can thereby relate to the speed, acceleration and/or movement direction independently of another change.

The predefined and defined temporal and spatial course of the deflection of the gripper jaws corresponds to dynamics of the movement of the gripper jaws according to a defined pattern and with a defined course. In other words, the predefined and defined temporal and spatial course of the deflection of the gripper jaws can be understood as a sequence of movements and movement changes according to a predefined pattern.

The predefined and defined temporal and spatial course of the deflection of the gripper jaws thereby, in particular, is effected during a deflection of the gripper jaws from a closed to an open condition. In particular, this predefined and defined temporal and spatial course of the deflection of the gripper jaws can, however, also be effected during a deflection of the gripper jaws from an open into a closed condition. Optionally, this however can also be effected on deflection from a closed to an open condition as well as on deflection from an open into a closed condition.

The control element is optionally designed from a wire-like or tubular material.

A functional contour can be manufactured in a particularly simple and inexpensive manner if the control element is shaped from a wire-like or tubular material. Alternatively, the control element can also be cast, manufactured with material-removing methods or assembled, which is to say put together.

The control element is optionally designed as one part with a gripper jaw.

A gripper jaw, which is designed as one part with the control element, is inexpensive and simple to manufacture. A gripper jaw can, for example, however also be formed as an element separate from the control element.

One advantage of a control element with a functional contour, which is as described above, is the fact that a simple switch is sufficient for interacting with this control element. The switch or the part of the switch that interacts with the functional contour of the control element can be designed in a simple manner due to the fact that the functional contour of the control element of the grippers controls the dynamics of the deflected gripper jaw.

A simple switch can, for example, be designed in a simple geometric manner, for example by a rod, plate, cuboid, rounded elements, balls, discs, wheels and likewise. A switch can be formed by rotatably mounted discs, wheels, balls, calottes and/or ball disks. A switch can be rigidly and immovably fastened, movably (in particular rotatably) fastened or resiliently fastened, in a conveying device.

A simple switch can be designed in an inexpensive and robust manner, can have a lower wear than ones shaped in a complicated manner, and can be produced in an inexpensive manner. A replacement, maintenance and/or adjustment of a simple switch is likewise easier switches formed or shaped in a complicated manner.

The switch does not need to have a functional contour if the control element has a functional contour. Many grippers cooperate or interact with few switches in a typical case. The wear of the functional contour is thus advantageously distributed onto a greater number of grippers instead of concentrated on one switch.

Optionally, the functional contour of the control element includes at least two consecutive, in particular at least three consecutive contour segments, wherein at least two and in particular at least three of the contour segments are different in curvature, curvature direction and/or curvature change.

Optionally, the functional contour of the control element includes at least four consecutive contour segments, wherein at least two or in particular at least three or in particular at least four of these contour segments differ with regard to curvature, curvature direction and/or curvature change.

Optionally, the functional contour of the control element includes at least one contour segment, whose functional contour, with regard to its shaping, takes into account physical changes of the control element given a force effect upon the control element, and in particular, with regard to its shaping, takes into account a bending of the control element given a force action upon the control element.

Physical changes in this application are to be understood as a reversible, mechanical change, for example an elastic deformation by way of bending, twisting (for example also torsion), compression and/or extension. "With regard to shaping, takes into account" in the framework of this application is to be understood in that the expected physical change of the control element is anticipated and compensated by way of an adapted shaping of the function contour, and on account of this the control element during the interaction can interact (for example, with a switch) in a manner as to follow a predefined course, despite the physical change of the control element.

The physical change is anticipated and compensated by way of taking into account the physical change in the shape of the functional contour. A control element, on account of the shape of at least one segment of the functional contour that takes into account the physical change, despite the physical change of the control element thus effects the same dynamics of the gripper jaws as a control element which undergoes a greater, smaller or no physical change and has a correspondingly different shape.

In the case of an easily bendable control element, for example, the functional contour of the easily bendable control element is adapted in a manner such that a gripper jaw, which is deflected by an interaction of the easily bendable control element with a switch, has the same position (or applies the same pressure) as with the interaction of a non-bendable control element with the same switch. Material characteristics and dimensioning (for example, a thickness) of the control element and a shape of the functional contour or an arrangement of the contour segments of the control element interact in this manner.

A targeted shaping of the control element thus compensates a deformation of the control element, for example during the interaction with the switch. The deflection of the gripper jaws follows the predefined and defined temporal and spatial course by way of this. The predefined and defined temporal and spatial course of the gripper jaws is thus not influenced by the physical change of the control element.

This has the advantage that the control element can be manufactured of a multitude of materials with a diverse dimensioning, and that the desired dynamics of the gripper jaws can be achieved independently of this. For example, control elements which are thin, and which can be easily bent by way of this can be formed without functional compromise compared to thick and non-bendable control elements. This, for example, saves production costs and also entails a weight reduction regarding the grippers. A weight reduction of the grippers, in turn, has a positive effect on the operation of the conveying installation: having to move less mass means that less energy is necessary and smaller motors and brakes are sufficient. Moreover, the safety is potentially increased when less mass is moved due to the fact that less kinetic energy is released in an uncontrolled manner in the case of an accident.

Optionally, the functional contour of the control element includes a first contour segment whose functional contour effects a release of a clamping force of at least one gripper jaw at a first speed, and a second contour segment whose functional contour effects an opening of the at least one gripper jaw at a second speed, where the opening of the at least one gripper jaw is temporally subsequent to the release of the clamping force of the at least one gripper jaw and wherein in particular the second speed is higher or lower than the first speed.

Clamping force is to be understood as a force, with which a gripper jaw acts upon an object gripped, i.e. with which force a gripper grips the object gripped therein. If no object is gripped, then also no clamping force acts.

Clamping force is to be understood as a force, with which a gripper jaw acts upon a gripped object, i.e. with which force a gripper grips the gripped object. The gripper jaws can exert a force on one another in the closed condition if no object is gripped. In particular, the gripper jaws exert no clamping force on one another in the closed condition when they do not grip an object.

The targeted shaping of the functional contour of the control element and which is described above controls a deflection of at least one gripper jaw from a closed into an open condition, wherein this deflection is firstly effected at a first speed, in particular for the slow release of a clamping force of the at least one gripper jaw, and thereafter at a second speed, which is greater than the first speed and, in particular, effects a rapid opening of the gripper. In other words, a rapid opening of the gripper can be achieved, for example, after a slow release of the clamping force of the gripper. This in contrast to uniform dynamics of an abrupt opening of grippers as is the case in the state of the art provides the advantage of a controlled and gentle opening with an opening duration which is short in spite of this.

A functional contour of the control element as is described above thus permits controlled dynamics of the movement of at least one gripper jaw. A controlled release of the gripped object without a transverse acceleration with respect to the conveying direction or with an exactly defined transverse acceleration with regard to the conveying direction can be achieved by way of this. The transverse acceleration of the object on opening the gripper is caused for example by the clamping force which acts upon the object during the opening of the gripper. The clamping force for example effects a spring movement (thus a springing-in) of the gripper jaws in the closed condition of the gripper with a gripped object, and if the gripper opens by way of a deflection of only one gripper jaw which is effected by a control element, then the gripper jaw which is not deflected by the control element rebounds and causes a transverse acceleration with an uncontrolled rapid opening of the gripper.

An undesirable transverse acceleration can be prevented by way of adapted dynamics of the movement of the gripper jaws, wherein the gripper opens as rapidly as possible despite this. Or, however, a predefined desired transverse acceleration can be achieved in a precise and reproducible manner by way of adapted dynamics, for example if an ejection movement in a certain direction, with a certain rotation and/or at a certain speed is desired.

Optionally, the functional contour of the control element comprises a first contour segment whose functional contour effects a closure of at least one gripper jaw at a first speed, and a second contour element whose functional contour effects the application of a clamping force of the gripper jaws at a second speed, wherein the application of the clamping force of the at least one gripper jaw is temporally successive to the closure of the at least one gripper jaw and wherein in particular the second speed is smaller or greater than the first speed.

A rapid closure of the gripper with a quick, first closure movement and a subsequent slow application of the clamping force of the gripper can be achieved for example with a functional contour as described above. Adapted dynamics of the movement of at least one gripper jaw can prevent an undesirable rapid increase of the clamping force on gripping an object, wherein as a whole a rapid closure of the gripper is possible despite this. Damage due to too rapid an application of the clamping force can be prevented, which for example is particularly advantageous with soft or brittle objects. Moreover, as the case may be, the position of the object can yet also change, for example with gripper jaws designed in a self-centring manner, with a slow application of the clamping force.

Optionally, the functional contour of the control element includes at least one contour segment and in particular at least two contour segments, whose functional contour in a region at the beginning and/or a region at the end of a force application onto the control element effects a continuous increase or a continuous reduction of the speed of the deflection of at least one gripper jaw.

A soft approach or soft braking of the at least one gripper jaw is achieved with a continuous increase or reduction of the speed of the deflection, which is particularly advantageous at high opening and closure speeds. This is gentle on the material with regard to the gripper jaw or to the gripper and/or to the object gripped by the gripper. A continuous increase or reduction, for example in the mathematical sense, can be constant, monotonous and/or strictly monotonous.

The invention can also include a device that includes a gripper as described further above and as well as a switch. Thereby, the switch includes a disc and, in particular, a wheel that interacts with the functional contour of the control element.

A known switch in the form of stationary guide that interacts with a simply designed control element of the gripper (for example a roller or a wheel) and thereby are to effect predefined dynamics of the gripper jaws, are designed in a complicated manner in comparison to a disc or, for example, also a wheel as switch.

Stationary guides moreover have a high wear. The wear is particularly high at the locations, at which a change of the force acting upon the gripper jaw is to be effected by the stationary guide, since each gripper interacting with this stationary guide runs through and loads the stationary guide. In other words, complicatedly designed stationary guides that have locations designed analogously to the functional contour of the control element and at which locations a change of the force acting upon the gripper jaw is to be effected, are particularly greatly loaded.

A switch in the form of a stationary guide is thus loaded to a greater extent than a cam guide on a gripper, if the conveying installation has more grippers than switch means.

A disc or a wheel as switch, in contrast, is designed in a simple and robust manner and can easily withstand a loading due to frequent interaction with many control elements.

The control element of the gripper is designed as a cam guide with a functional contour, in order to effect predefined dynamics of the gripper jaws. The gripper jaws move according to predefined dynamics in this manner, but the wear is greatly reduced since each individual gripper has a cam guide with a functional contour, which is only loaded in each case on interaction of the individual gripper with the switch.

The state of the art which with a stationary guide with a functional contour has a high wear is in contrast to this. A functional contour of a stationary guide or of a switch is loaded significantly more frequently and therefore has a greater wear than a functional contour of a cam guide of a single gripper since a conveying installation typically has significantly more grippers than switches.

A location that is particularly prone to wear, such as with rigidly fastened, stationary guides, where for example a location at which the stationary guide begins to interact with the control element or a particularly high loading and/or occurrences of wear occur such as with an abrupt bending or shape changes of the stationary guide, does not occur on the part of the switch means due to the round shape and the rotation of the switch or the wheel.

A switch that includes a wheel is thus particularly simple and inexpensive to realise and is less prone to failure and simpler to maintain or replace. Further advantages of a simply designed switch have already been described further above.

The switch is optionally designed as a wheel with a groove on the peripheral side.

A control element can be advantageously led by a groove on the peripheral side. A danger of a slippage during its interaction is greatly reduced.

In particular, the groove comprises a concave cross section. If the groove has a concave cross section, the control element on interaction with the switch can be positioned within the groove, for example by way of centering with respect to the cross section of the groove. Alternatively, the cross section of the groove can also have different shapes, for example angular/polygonal, step-like or partly convex.

A conveying installation corresponding to a not yet published patent application of the same applicant is described in the subsequent sections for the purpose of an improved illustration of the invention. The conveying installation comprises a drive body movable along a closed circulating path, and includes a plurality of grippers that are coupled onto the drive body or can be coupled thereto. The drive body, for example, is a continuous conveying body that is moved in a guide, for example, a chain in a channel, in particular a guide channel. The drive body can alternatively also be realised by a rotation body or by individual vehicles.

As an optional feature, the conveying installation mentioned above additionally includes a transfer mechanism. The transfer mechanism can bring a gripped object from a first gripper of the conveying installation into a second gripper of the conveying installation. Thereby, in particular the gripped object is brought out of a first position with respect to the first gripper into a second position with respect to the second gripper, and the first and the second position with respect to the respective gripper differ in contact locations with the gripper, location of the object with respect to the gripper and/or orientation of the object with respect to the gripper.

The transfer mechanism permits a bringing of a gripped object from a first gripper into a second gripper on the same circulating path in the same conveying installation. The gripped objects, on running singularly through the closed circulating path, can jump parts of the closed circulating path and/or or run through them several times and/or in particular selectively run through them several times, due to a transfer of gripped objects. This increases the application possibilities of the conveying installation and renders it more flexible. Alternatively, one can make do without a transfer mechanism. Alternatively, a transfer of gripped objects can also be effected without a transfer mechanism. One can also make do without a transfer of gripped objects.

An even more flexible and comprehensive application of the conveying installation is possible due to the fact that a first and a second position of the gripped object with respect to the respective gripper differ from one another within the same conveying installation before and after the transfer. The difference of the first and the second position can lie in the contact locations of the object with the gripper, the location of the object with respect to the gripper and/or the orientation of the object with respect to the gripper. The gripped object can be acted upon in a different manner, for example, and/or the gripped object can be acted upon from different spatial directions, on account of different contact locations, different position and/or different orientation. The application possibilities and the flexibility of the conveying installation in particular can increase in combination with the possibility of jumping parts of the closed circulating path and/or selectively running through them several times. The positions of the gripped objects with respect to the respective gripper can alternatively also be the same before and after the transfer.

With regard to the conveying installation, grippers that have an individually controllable first gripper jaw and an essentially constructionally identically designed second gripper jaw and first and second control elements, which are assigned to these are preferably applied. The installation moreover has first and second switches which, for the targeted opening of the first and/or second gripper jaw, interact with the first and second control elements respectively. The switch can be arranged at different opening locations along the circulating path or also at the same ones, in order to open the gripper or an individual gripper jaw there in a targeted manner.

An opening location, at which a first and a second switch are arranged, is preferably present. The switch can be activated and deactivated by a control device, in order to selectively open the first or the second gripper jaw. The direction, in which the object is released, can be influenced by way of this.

The grippers are fastened on the drive body such that they receive the objects, preferably essentially from above, i.e. in a manner hanging on the drive body. The opened gripper mouth points downwards preferably in the vertical direction with the receiving, and the object can be inserted therebetween. The objects can therefore be arranged in a standing manner at the receiving (pick-up) location, and the conveying installation can be located above instead of next to the receiving location. Space is saved in the lateral direction by way of this. The grippers can assume other orientations in other regions of the path.

The conveying installation in particular is suitable for gripping, conveying and releasing spatially extended objects of an almost infinite shape. Above all, it is suitable for symmetrical objects and/or this with a holding ring and/or objects with a hollow shape. A preferred case of application is the conveying of preforms for blow moulding containers of plastic, in particular PET bottles. Objects with different shapes and/or sizes can be conveyed into the region to be gripped, with constructionally identical grippers. A mixed operation with which different objects are simultaneously conveyed in the conveying installation is also possible due to the large adaptation capability of the grippers. The objects can be released in different directions in a targeted manner and with this, be fed to different further-processing stations, on account of grippers with two constructionally identical and individually activatable gripper jaws.

A sorting of objects is possible due to the directed product release. Seen in the conveying direction, the objects can be released to the right or to the left and be fed to different further stations or conveying paths, in a manner depending on predefined features such as, for example, the size. This sorting function can be realised with simple means.

A conveying installation as described above can optionally be operated by a method in which, in a first step, an object to be gripped is gripped by a first gripper of the conveying installation. In a second step, the gripped object is brought from the first gripper of the conveying installation onto a second gripper of the conveying installation. The gripped object in a third step is released from the second gripper of the conveying installation.

In the second step of the method described above, the gripped object is brought from a first position with respect to the first gripper into a second position with respect to the second gripper, as an additional option, wherein the first and second position with respect to the respective gripper differ in contact locations with the gripper and/or in the location of the object with respect to the gripper and/or in the orientation with respect to the gripper.

The advantages and alternatives of a conveying installation, which is operated by a method having the three steps described above have already been described above with the description of the transfer mechanism. This analogously applies to advantageous and alternatives of different positions of gripped objects with respect to the respective gripper before and after the second step (thus before and after the transfer). Optionally thereby, an object that is gripped after the second step of the method runs at least partly though a same section of the closed circulating path of the conveying installation, through which the same gripped object has already run before the second step of the method. In other words, the same object gripped by the second gripper at least partly runs through the same circulating path which it has already run through gripped by the first gripper.

The advantages of parts of the closed circulating path which are run through several times and, in particular, selectively run through several times have likewise already been described above. Parts of the circulating path can alternatively also be jumped, thus left out or shortened. In this manner, in particular disconnected processing stations can be bypassed, which is to say corresponding parts of the circulating path bridged. The same circulating path of the conveying installation can thus be applied and operated in a much more comprehensive, flexible and also more efficient and economical manner.

The object with regard to the second aspect is at least partly achieved by a conveying installation described in the following section.

The installation includes a conveying installation with a plurality of grippers, which are movable along a circulating path. Thereby, each gripper includes at least one first gripper jaw, at least one second gripper jaw and at least one control element, and the at least one control element interacts with a switch for the targeted opening of the first and/or second gripper jaw. Moreover, the conveying installation along the circulating path includes at least one first opening location with a switch of a first type, and a second opening location with switch eans of a second type. Also, each gripper of the conveying installation includes at least one control element which is configured in a manner such that this control element either interacts with a switch of the first type or with a switch of the second type.

Switches of a different type differ by way of the fact that they each interact only with a specific selection of control elements. For example, switches of a different type differ by way of different spatial arrangements, by temporally different phases of the interaction and/or by way of different acting manners or types of interaction.

One example of switch of a different type with a different spatial arrangement are switches that each comprise a rotatably mounted disc, wherein the discs are arranged at a differently large distance and/or different sides of the grippers which are conveyed past. A gripper interacts with only one type of switch depending on the distance of the functional contour of the control element to the gripper.

One example of switches of a different type with temporally different phases of the interaction are switches each comprising a rotatably mounted disc, wherein the discs comprise recesses in the peripheral side and the disks at their peripheral side rotate at the same speed as the grippers. Control elements that hit the recesses of the discs of the switch on conveying past the switch cannot interact with this switch due to the absent contact with the switch. Temporally shifted phases of the interaction of a switch with grippers of the conveying insulation can be formed by way of arranging a plurality of such switches after one another in the conveying direction.

The grippers of the conveying installation can include one control element, two control elements or more, wherein the number of control elements per gripper can vary. The control elements can be designed in a manner such that they can only interact with one type of switch or with several types of switches.

The grippers of the conveying insulation with respect to the second aspect can include control elements that are designed as cam guides. The grippers of the conveying installation can, however, alternatively also include control elements that are not designed as cam guides. The grippers of the conveying installation can also comprise control elements that are partly designed as cam guides and partly not as cam guides.

A conveying installation can include at least two, at least three or in particular at least four opening locations. Thereby, the opening locations each include at least one switch, in particular however each at least two switches, in particular each at least three or more switches.

The conveying installation comprise at least one switch of the first type and a switch of the second type that are each arranged at different opening locations. The conveying installation can also include switches of three different types or even more different types that are arranged at the same and/or different opening locations.

A conveying installation with opening locations which include switches of a different type can convey gripped objects to different opening locations in a targeted manner. This, for example, permits a sorting of conveyed objects, by way of these being ejected or being removed from the grippers, by way of a targeted opening of the grippers at different opening locations. For example, different processing stations such as for a further processing can be provided with objects according to requirements, by way of such a conveying installation. Filling and/or packaging stations and/or device for a further conveying, according to requirements can also be provided with objects conveyed by the conveying installation.

Optionally, the conveying installation includes a plurality of grippers having an individually controllable first gripper jaw and an essentially constructionally identically designed second gripper jaw, and first and/or second control elements which are assigned to these, and with switches of the first and second type that interact with the first and second control elements respectively, for the targeted opening of the first and/or second gripper jaw.

Grippers with gripper jaws designed in an essentially constructionally identical manner can be inexpensively formed, and the maintenance and replacement is simple and uncomplicated on account of essentially constructionally identical components.

The gripper jaws, however, can also be designed differently. In particular, the gripper jaws can only differ in that the control elements are designed in a manner such that the control elements interact in each case with a switch of a different type. In particular, the control elements for this are arranged at different distances to the respective gripper jaws.

Optionally, the conveying installation along its circulating path includes at least one detection apparatus, which is designed in order to deliver information on the grippers and in particular on gripped objects, to the conveying installation.

The detection apparatus in particular can include a sensor and/or be coupled to a sensor that is internal and/or external with respect to the conveying installation.

The detection apparatus along the circulating path offers the advantage that the detection apparatus provides the conveying installation with information that the conveying installation can process further, for example for the targeted control of grippers, for the automation of sequences, for quality control and/or for monitoring or as a safety control.

The information, for example, can be information on the opening degree of the gripper, the clamping force of the gripper, the filled condition of the gripper, a quality and/or type of the gripped object and/or sort of the gripped object. Sort is to be understood in that for example objects of the same type can however be of a different sort, such as a different size, colour, thickness, paint and/or nature.

The detection apparatus, for example, can transmit the information as to whether a gripped object has a certain quality or not, for example has a deformation or a tear or an insufficient thickness, to the conveying installation.

In the case of an insufficient quality, the conveying installation can take suitable measures, such as an opening of the respective gripper at a certain opening location. The conveying installation can be provided with a quality control, which automatically sorts out rejects in this manner.

The conveying installation optionally along its circulating path, apart from a first opening location with a switch of a first type and a second opening location with a switch of a second type includes a further opening location with a switch of the first type as well as a switch of the second type.

A further opening location with a switch of the first and second type can ensure that a gripper is opened with control elements that interact with a switch of the first and/or second type, is opened. The further opening location is hereinafter indicated as the third opening location. The third opening location can simultaneously include all types of switches with the use of more than two types of switches.

The third opening locations can serve for opening a gripper that is led past, in any case and by way of this for opening all grippers of a conveying body at this location. This in particular can be used, in order to remove all gripped objects from all grippers at a certain location.

Optionally, at least one of the switches of one of the conveying installations described above can be activated and deactivated by a control device, so that these switches selectively cooperates or not with control elements of led-past grippers.

The control device can be automatically controlled and/or manually switched. The control device, for example, can be controlled by the conveying installation itself or by signals originating from outside the conveying installation.

Optionally, the conveying installation along its circulating path includes at least one control-device-free switch of each type that interacts with each control element, which is conveyed past and is configured accordingly.

If the conveying installation includes at least one control-device-free switch means of each type along its circulating path, then each control element in the course of a running through the circulating path interacts with a switch at least at one opening location. This ensures that a gripper interacts at least once with a switch with a complete run through the circulating path. In this manner, it is ensured that each gripper is opened, for example, with a complete run through the circulating path. This can be used for ensuring a complete emptying of the conveying installation during a complete run-through of the circulating path.

The circulating path optionally includes at least one treatment section (stretch), in particular a treatment section running in a spiral-like manner.

The treatment section is part section of the circulating path, wherein the conveyed products are treated on the part-section. The products, for example, can be painted, surface-treated, thermally treated (cooled and/or heated), irradiated (e.g. with ionising and/or non-ionising radiation), chemically treated, sterilised and/or showered in ozone, on the treatment section. All treatments can be applied once or several times and also in combination with one another and/or in a consecutive manner. The treatment section in particular is a cooling section, at which the conveyed products can cool down or be cooled.

The treatment section, for example, can run in a helical manner, have the shape of a helix or run in only a single plane. The treatment section can also have other shapes such as a straight line or curved shapes in a plane but also above and next to one another in several planes.

The conveying installation optionally includes a transfer mechanism as well as grippers with at least two gripper jaw pairs.

The respective advantages of the transfer mechanism as well as of grippers with at least two gripper jaw pairs are described further above.

The object with regard to the third aspect is achieved at least partly by a conveying installation, which is described in the following paragraph.

A conveying installation that includes a drive body having several members, wherein each member has a plurality of gripper jaw pairs, and objects of different sorts are arranged along the drive body in groups of objects of the same sort, wherein groups of objects of the same sort are gripped by gripper jaw pairs, which at least with a group of objects of the same sort, are arranged on at least two members of the drive body. This third aspect of the invention can be realised in combination with the other aspects of the invention or however completely independently of these. In other words, according to the third aspect, groups of objects of the same sort reach beyond the limits of members of the drive body.

The grippers of the conveying installation with regard to the third aspect can include control elements that are designed as cam guides. The grippers of the conveying insulation alternatively can also include control elements that are not designed as cam guides. The grippers of the conveying installation can also include control elements tht are partly designed as cam guides and partly not as cam guides.

In particular, with regard to the third aspect, gripper jaw pairs, by way of which objects of at least two sorts are gripped in groups of the same sort in each case, are arranged on at least two members of the drive body, in all groups of a first sort of objects.

Optionally, with respect to the third aspect, gripper jaw pairs, by way of which objects of at least two sorts are gripped in groups of the same sort in each case, are arranged on at least two members of the drive body, in all groups of the first sort as well as in all groups of a second sort of objects.

Optionally, with regard to the third aspect, gripper jaw pairs, by way of which objects of at least two sorts are gripped in groups of the same sort in each case, are fastened on at least two members of the drive body in all groups of each sort of objects.

Such a conveying installation with respect to the third aspect provides the advantage that objects of different sorts can be transported in a groupwise manner without an arrangement and size of the groups being limited and/or determined by an arrangement and size of the members of the drive body.

For example, the efficiency and the conveying performance of the conveying installation can be increased by way of an increase in the number of gripper jaw pairs per gripper, without a limitation and/or predefining of the type of the conveyed objects and in particular of the size and/or arrangement of the groups of conveyed objects of the same sort being effected by way of this increase.

With respect to the third aspect, for example, a member of the drive body include two gripper jaw pairs.

A member of the drive body can, however, for example also comprise three, four and in particular five gripper jaw pairs, with regard to the third aspect. The number of gripper jaw pairs per member for example can also vary from member to member. A plurality of gripper jaw pairs per gripper increases the efficiency and conveying performance of the conveying installation and reduces the costs with the manufacture, maintenance and repair of the conveying installation.

With regard to the third aspect for example, two groups in each case of three objects of the same sort can be conveyed in the conveying direction one after the other in an alternating manner.

The number of objects in each case of the same sort per group with regard to the third aspect can, for example, also be four, five and in particular six. The number of objects in each case of the same sort per group can also vary from group to group.

A conveying of objects in each case of the same sort in groups permits an efficient conveying of objects which, for example, are produced in batches or as a lot and/or are processed or required as a group of several ones.

With regard to the third aspect, a group of objects of the same sort can optionally be gripped by gripper jaw pairs, which per group are fastened at the most on two, in particular at the most on three and, in particular, at the most on four members of the drive body.

A distribution of groups of several objects in each case of the same sort onto several members of the drive body permits a stable and flexible conveying of this group and/or a flexible adaptation of conveying installations to new tasks.

With regard to the third aspect, optionally gripper jaw pairs, by way of which a group of objects of the same sort are gripped, include at least one control element that can only interact in each case with a specific switch, which are different according to the sort of objects.

In particular, with regard to the third aspect, each gripper jaw pair is fixedly programmed. In other words, each gripper jaw pair is designed in a manner such that it only interacts with a switch of a certain type and, as the case may be, only with a switch of a certain type that are assigned to a certain sort of objects.

The advantage of fixedly programmed gripper jaw pairs lies in low manufacturing and maintenance costs, simple design and simple manner of functioning.

A solution of the object with regard to the third aspect can be realised by a method for operation of a conveying installation, the method being described in the following paragraph.

A method for operating a conveying installation, wherein the conveying installation includes a drive body having several members, wherein each member includes a plurality of gripper jaw pairs, wherein objects of different sorts along the drive body are conveyed in groups of objects of the same sort, and groups of objects of the same sort are conveyed by gripper jaw pairs, which at least with a group of objects of the same sort, are arranged on at least two members of the drive body.

Features of the invention can be combined with features of the examples described for a better illustration of the invention and vice versa, in as much as this is not ruled out for technical reasons.

In particular, features of different aspects can be combined with one another. In particular for example, all grippers described above include control elements with a functional contour with at least one arcuate contour segment.

BRIEF DESCRIPTION OF THE DRAWINGS

Examples of the invention are represented in the figures and are described hereinafter. In a purely schematic manner are shown in:

FIG. 1a-d a gripper with two gripper jaws in the form of bows, in different views;

FIG. 8 a conveying installation;

FIG. 9 a detail of the conveying installation with grippers with two gripper jaw pairs;

FIG. 21a-f schematically represented arrangements of switch means along a circulating path of a conveying installation;

DETAILED DESCRIPTION OF THE INVENTION

FIGS. 1 to 8 and 12 to 13 for the purpose of a better illustration of the invention show embodiments according to a not yet published patent application of the same applicant.

FIG. 1a-d shows a gripper 1 with a gripper body 10 and two gripper jaws 20, 30 in the form of bows 21, 31, in different views in the closed condition.

Figure 3B:
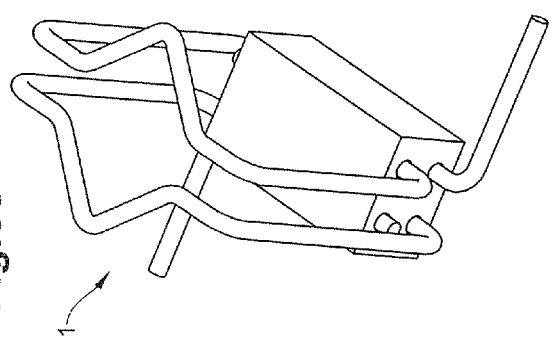
FIG. 3a-e an alternative gripper with two gripper jaws in the form of bows, in different views.
Figure 3C:
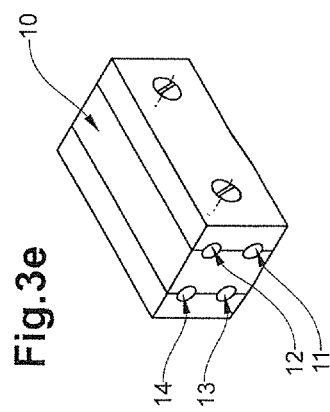
Figure 3E:
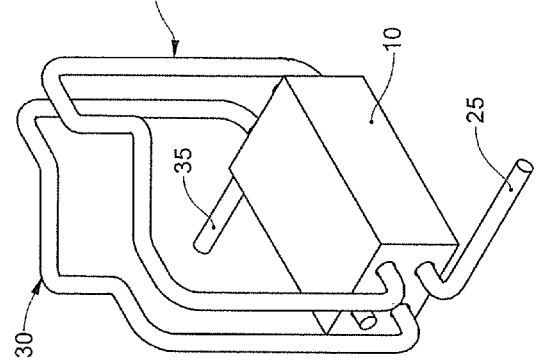

The gripper body 10 is essentially cuboid and comprises four tube-like recesses 11, 12, 13, 14 which are continuous in the longitudinal direction. As is shown in FIG. 3e, it can consist of several parts which are connected to one another, wherein the recesses are formed by grooves along the connection surfaces of these parts. Two of the recesses 11, 12 and 13, 14 in each case lie in a common plane E1 and E2 respectively and run parallel to one another. The gripper body 10 here includes additional elements that are not shown here and with which it can be coupled onto a drive body of a conveying installation.

The gripper jaws 20, 30 have the shape of a loop, which in the elevation view (FIG. 1a) is essentially rectangular and comprises two fastening sections 23, 24 and 33, 34 respectively, which lie next to one another and which run parallel to one another. The bows 21, 31 are mounted in the recesses 11, 12 and 13, 14, respectively, in the gripper body 10, with these fastening sections 23, 24 and 33, 34 respectively. Each of the fastening sections 23, 24, 33, 34 merges into a section 26, 27 or 36, 37, which is orientated roughly at right angles thereto. These sections are connected to one another by way of a further section 28, 38, which again runs roughly parallel to the fastening sections of the respective bow 21, 31. The clamping region 22, 32 is located within the further section 28, 38. Whereas the sections 23, 24, 26, 27 and 33, 34, 36, 37 lie essentially in the plane E1 and E2 respectively, the clamping regions 22, 23 are orientated perpendicular to these planes. Together they form a recess 40 by way of this, in which an object is received and for example can be held by way of engaging below a holding ring or an abutment. In the present example, the clamping regions 22, 32 are formed by way of the bow 21, 31 projecting outwards out the plane E1 and E2 respectively in the manner of a triangle, so that the recess 40 tapers outwards.

The bows 21, 31 in an end region moreover have an actuation section 25, 35, which projects out of the plane E1 and E2, respectively. The actuation section 25, 35 as a control element interacts directly with a switch or carries a cam roller 25', 35' (FIG. 2a), which rolls on such a switch. The actuation section and control element indicate the same element and are used synonymously. The actuation sections 25, 35 of both gripper jaws 20, 30 in this example are arranged on the same side of the gripper body 10, but point in opposite directions (mirror-symmetrical construction shape). They are located on opposite sides of the gripper body 10 in the example of FIG. 3a-e (axis-symmetrical construction shape).

Figure 2A:
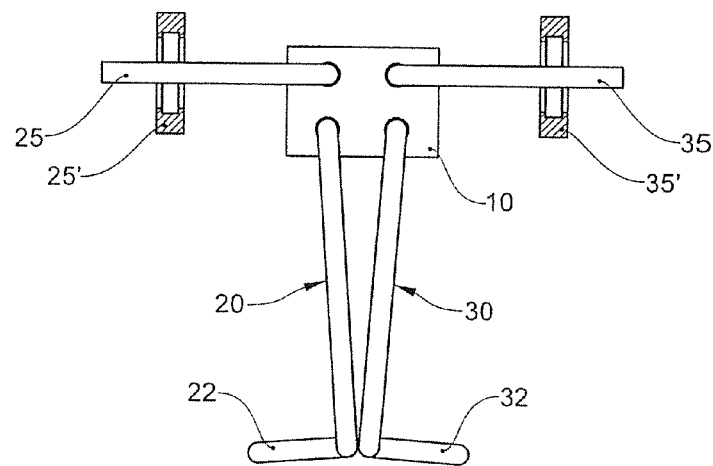
FIG. 2a-c the gripper of FIG. 1a-d in a closed condition, a condition open at one side and open at both sides.
Figure 2B:
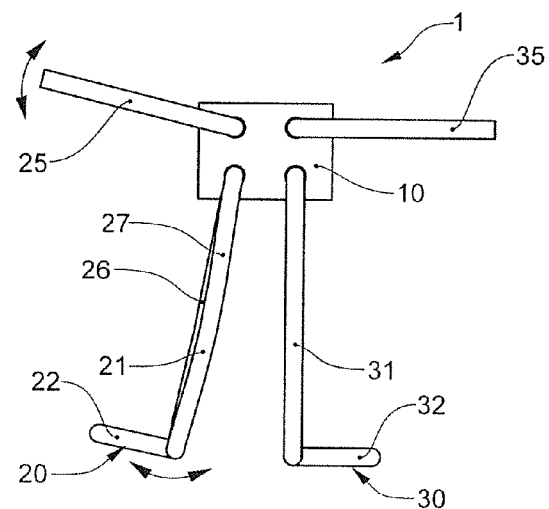
Figure 2C:
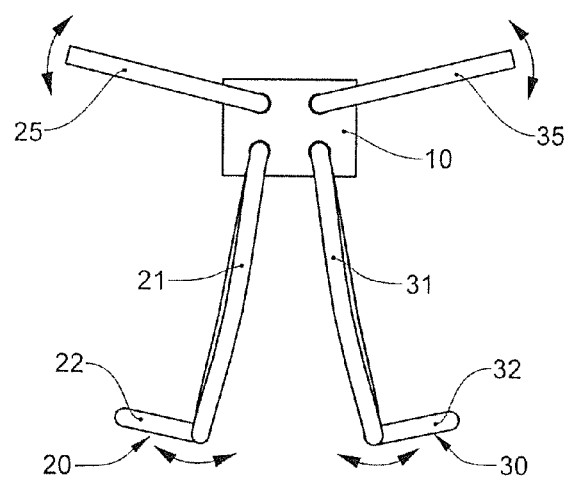

The gripper 1 functions as follows: The fastening sections 23, 24 and 33, 34 are located in the recesses 11, 12 and 13, 14, respectively, in the gripper body 10. The bows 21, 31 assume the idle position shown in FIG. 1b-d by way of this, in which position they are located in parallel planes E1, E2. One can also succeed in the bows pressing against one another in the non-loaded condition (without actuation by the control element) by way of a suitable biasing or preshaping of the bows, as is shown in FIG. 2a. The fastening sections 23, 24 and 33, 34 of a bow 21, 31, respectively, are not mounted along a common axis, but in each case along two preferably parallel axes A1, A2, A1', A2', which are given in each case by the recesses 11, 12 and 13, 14, respectively. On account of this, the bows cannot freely rotate, but deform when a force is exerted upon them from the outside due to actuation of the lever-like actuation sections 25, 35. The bows 21, 31 are pivoted about an approximate pivot axis, which roughly lies in the region of the middle between the two axes A1, A2 or A1', A2'. FIG. 2b shows the deflection and twisting of the first gripper jaw 20 on actuation of the lever 25. FIG. 2c shows the deflection and twisting of both gripper jaws 20, 30 on actuation of both levers 25, 35. The elastically deformed bows 21, 31 return back into the defined initial position on releasing the actuation sections 25, 35.

The bows 21, 31 do not need to be manufactured as one piece, but can also consist of several elements that are rigidly connected to one another. These elements, for example, can consist of different materials.

Figure 3D:
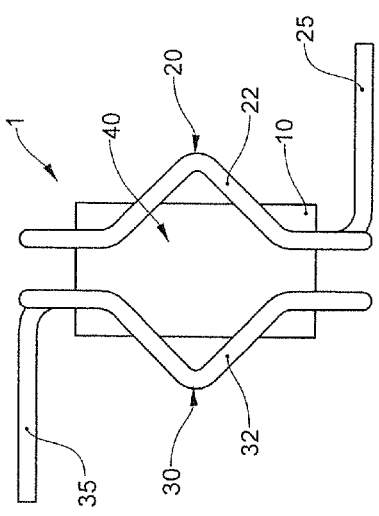
Figure 3A:
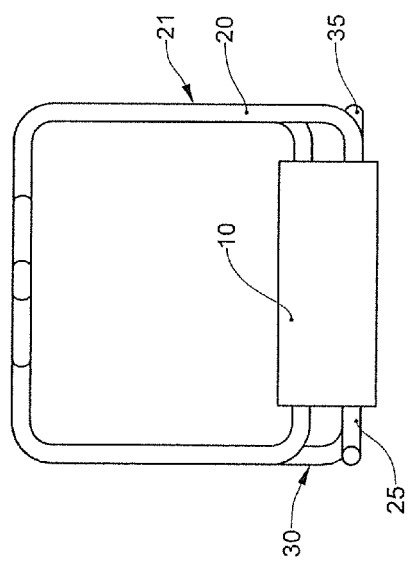

FIG. 3a-e shows a variant of the gripper of FIG. 1a-d, FIG. 2a-c, with which the actuation sections 25, 35 are located at opposite sides of the gripper body 10. The bows 21, 31 and the gripper body 10 are otherwise equal in construction and function. The gripper bodies can be of several parts (FIG. 3e). FIG. 3d shows a view from above onto the clamping regions 22, 32 of the bows 21, 31.

Figure 4:
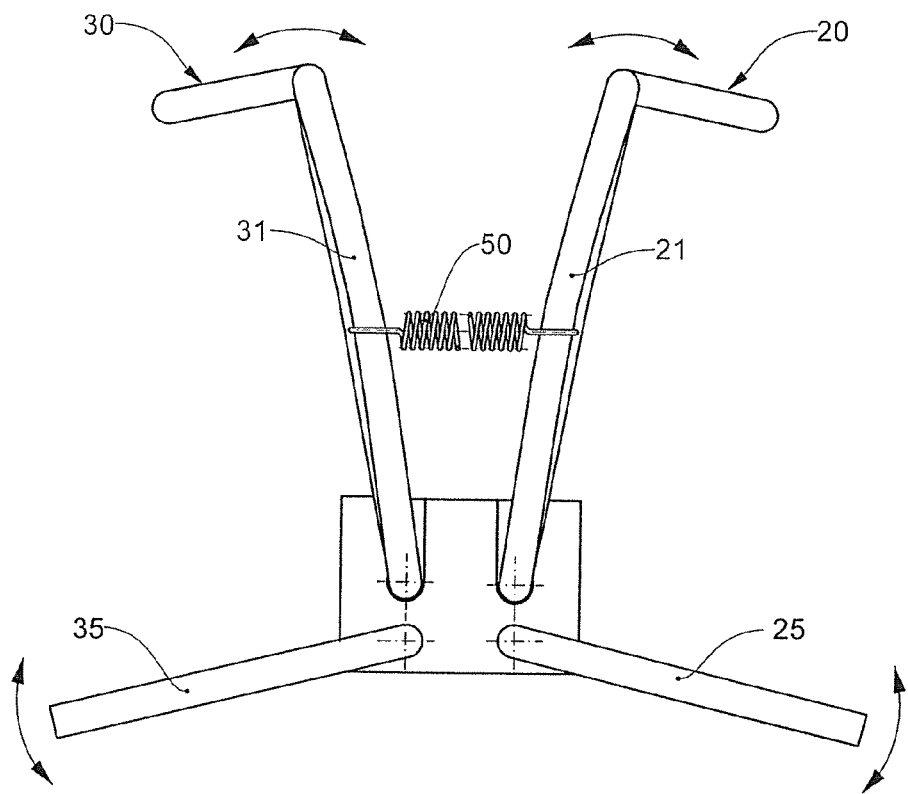
FIG. 4 a gripper with inwardly biased gripper jaws.

FIG. 4 shows a gripper 10 as in FIG. 1a-d, with which the bows 21, 31 are biased against one another by way of an additional biasing element 50, here a spring element.

Figure 5:
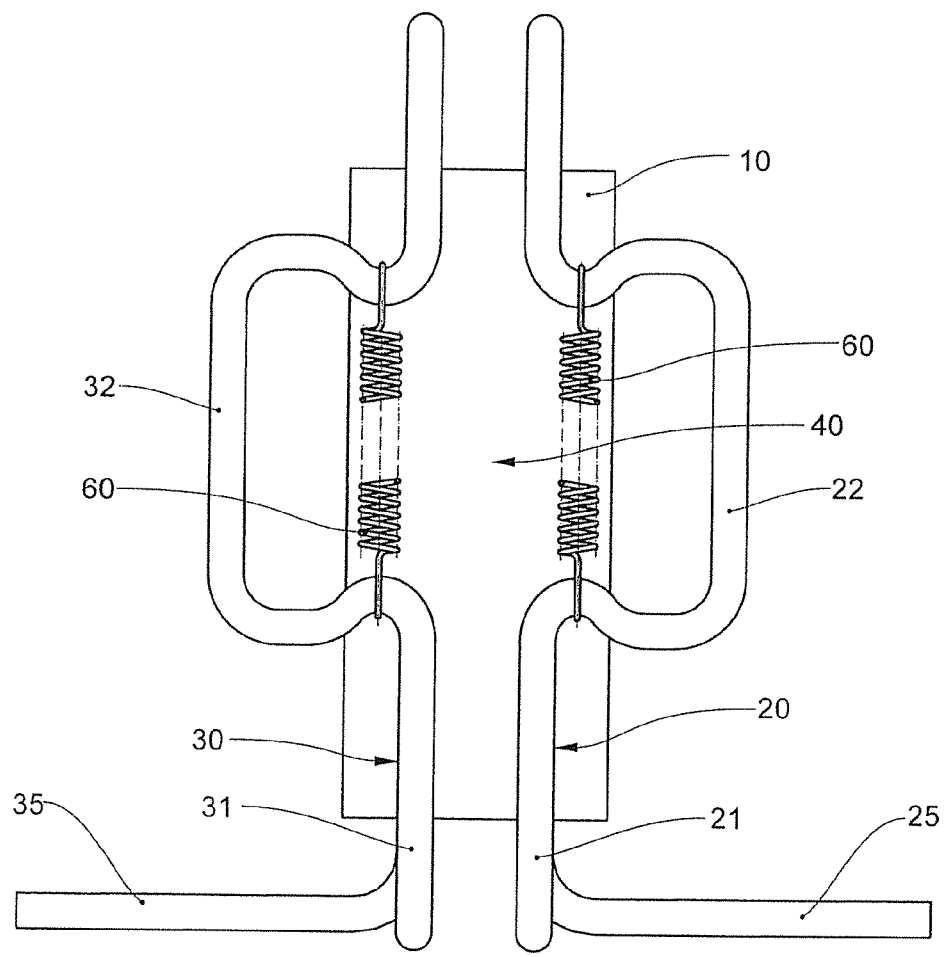
FIG. 5 a gripper with additional elastic clamping elements in the clamping region.

FIG. 5 shows a further gripper in a view from above onto the clamping regions 22, 32 of the bows 21, 31. The clamping regions 22, 32 are bent in a U-shaped manner. A clamping element 60, which has a greater elasticity than the bow 21, 31, is located between both limbs of the U. It is, for example, a spring element or a rubber element. The two clamping elements 60 serve for the gripper 1 being able to better adapt to different circumferences and shapes of the objects to be taken over or received, and to be able to hold the object in a more reliable manner. The receiver 40 is adequately large for the springs to be able to yield outwards. The objects can also be gripped with a friction fit by way of a suitable surface design of the clamping element 60.

Figure 6A:
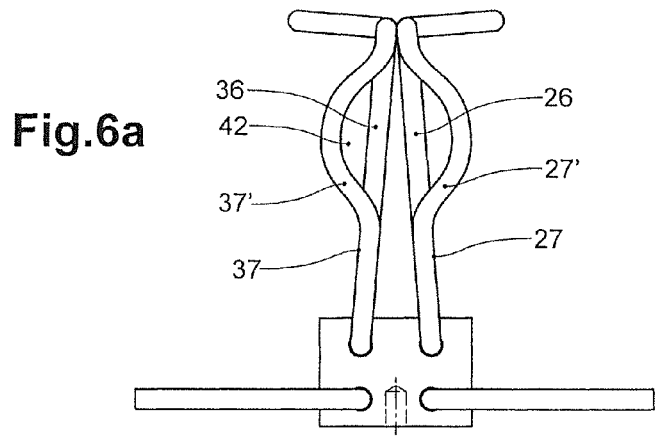
FIG. 6a-d a further alternative gripper with two gripper jaws in the form of bows and different momentary pictures of this gripper on receiving objects.
Figures 6B, 6C:
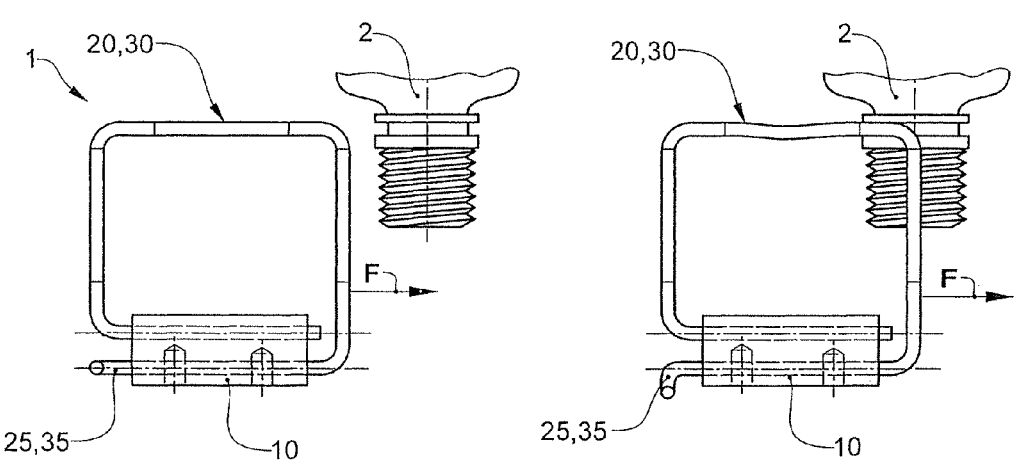
Figure 6D:
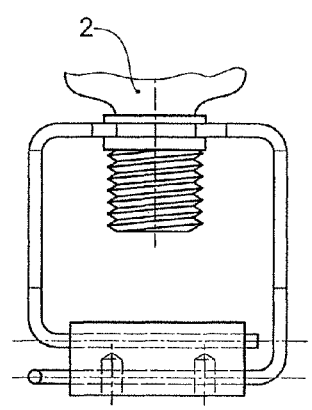

FIG. 6a-6d show a variant of the gripper of FIG. 1a-d with a self-opening function. One of the lateral sections 27, 37 of the bow 21, 31 is regionally bent in a U-shaped manner, so that a recess 42 is formed between the sections 27, 37. These U-shaped sections serve as actuation elements 27', 37' for the at least partial opening of the gripper 1 by way of an object to be received, when the gripper is moved from the side, i.e. perpendicular to the picture plane in FIG. 6a and in the conveying direction F in FIG. 6b-d, against the object 2 (FIG. 6b). The laterally approached object 2 presses apart the two limbs 27, 37 (FIG. 6c). The gripper 1 opens somewhat by way of this, so that the object moves into the receiver 40 in the clamping region and is received by the gripper jaws when these snap back (FIG. 6d). The actuation sections 25, 35 are not moved by a switch, but indirectly via the bow 21, 31.

Figure 7A:
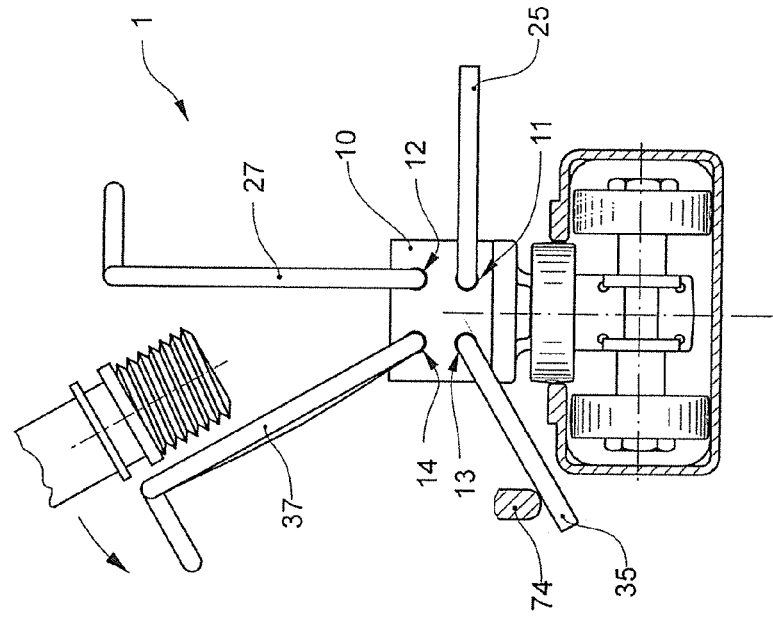
FIGS. 7a+b a gripper on releasing an object by way of selective opening of a first and a second gripper jaw respectively.
Figure 7B:
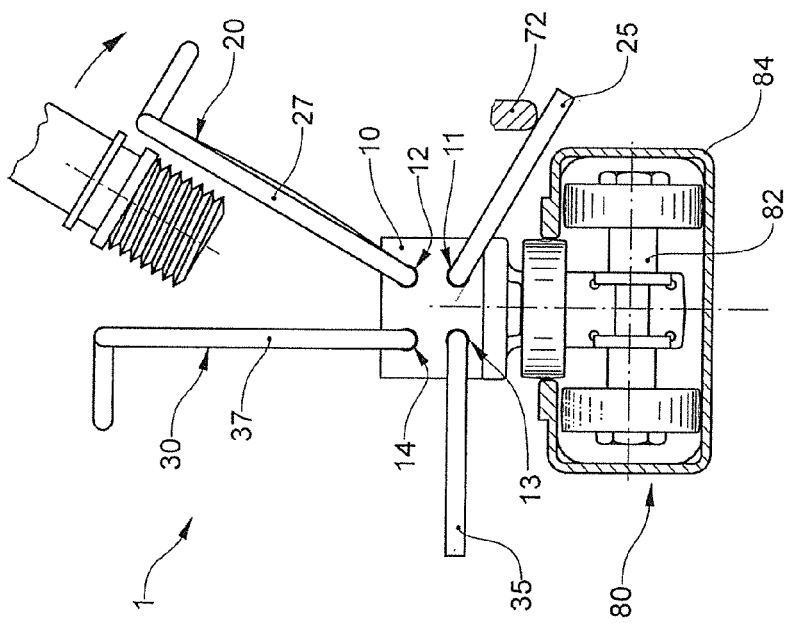

FIGS. 7a+b show a gripper 1 on release of an object 2 by way of selective opening of the first and second gripper jaw 20, 30 respectively, by way of a first and second switches 72, 74 respectively. The left gripper jaw 30 is deflected downwards to the left when it is activated. The object 2 then falls to the left (FIG. 7a). On opening the right gripper jaw, the object accordingly falls to the right (FIG. 7b). A directionally controlled release and, with this, a sorting function can be achieved in this manner.

FIGS. 7a+b moreover show the mounting of the gripper 1 on a drive body 82 of a conveying installation 80. The drive body 82 here in particular is a continuously moved chain whose movement path is fixed by a channel 84. The conveying direction is perpendicular to the plane of the picture. The chain 82 here has several chain links of which, for example, each or every second one serves as a carrier for the gripper 1.

FIG. 8 shows a conveying installation 80 according to the invention, with a drive body 82, here a chain, which is movable along a closed circulating path U. A plurality of grippers 1 is coupled onto the drive body 82. Switches 72, 74 are also present and these interact with the control elements 25, 35 such that the grippers 1 are opened at an opening location S. The gripper jaws 20 which are at the right in the conveying direction F are opened by way of actuating the first control elements 25, and the left gripper jaws 30 are opened by way of actuating the second control elements 35. The switches 72, 74 are preferably switchable, so that selectively the one or the other or both can be activated, in order to release the object 2 to different processing paths as is shown in FIG. 7a+b.

Figure 10:
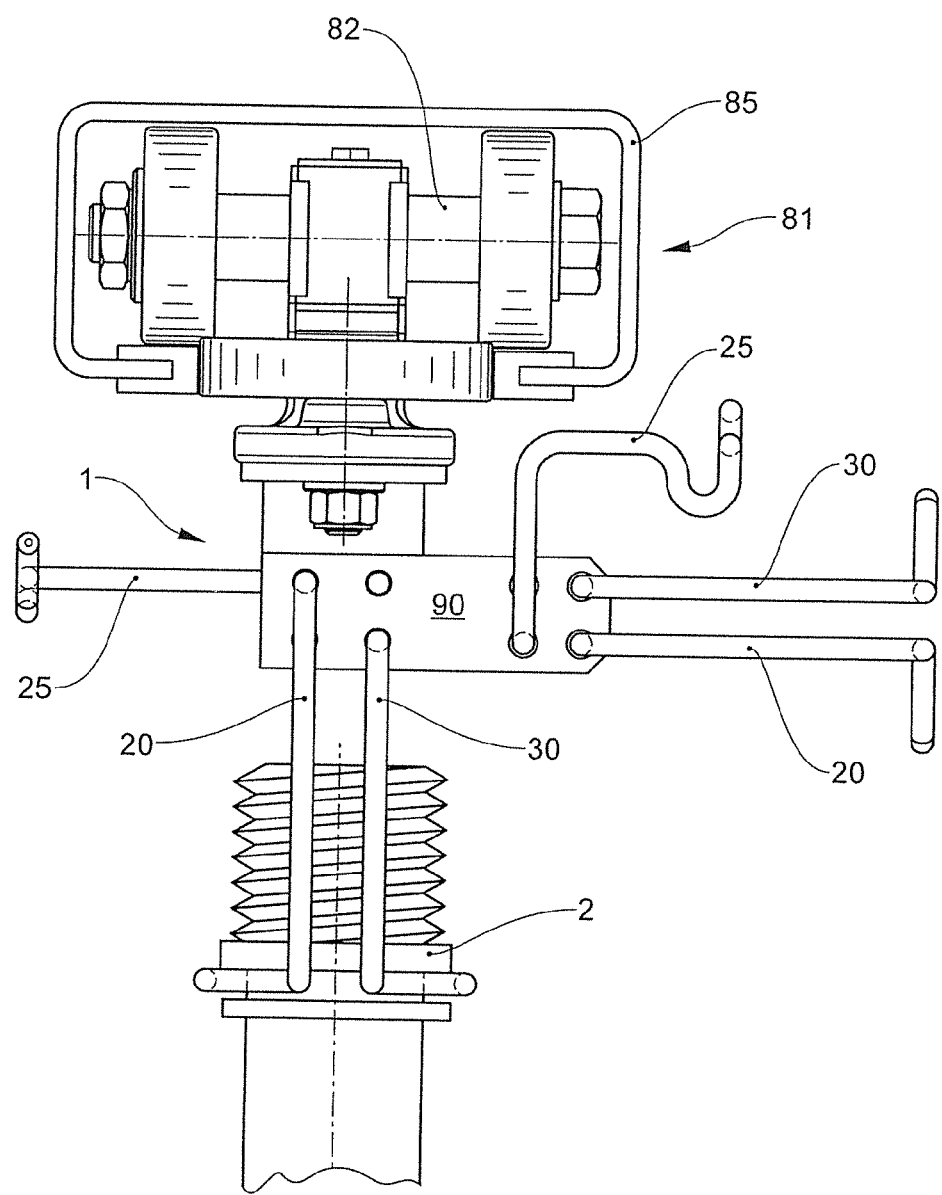
FIG. 10 a first cross section through the conveying installation of FIG. 9.
Figure 11:
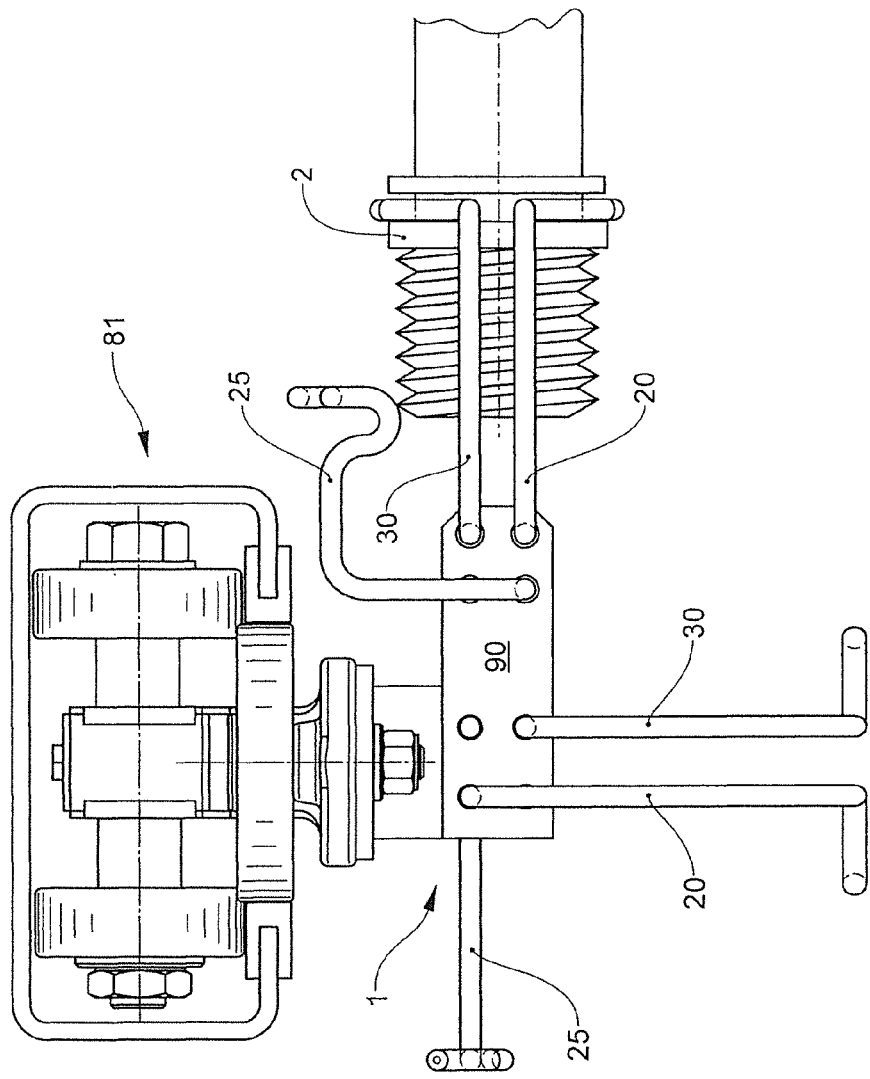
FIG. 11 a second cross section through the conveying installation of FIG. 9.

FIGS. 9 to 11 show embodiments with control elements with a functional contour. The manner of functioning of such functional contours is explained in the description of FIG. 14 and hereinafter.

FIG. 9 in a perspective view shows a detail of a conveying installation 81, which includes grippers 1 with two gripper jaw pairs. Two grippers 1 are shown in FIG. 9 and these are fastened on the drive body 82. The drive body 82 is a chain and moves within a channel, which here is designed as a guide channel 85. The chain 82 includes several chain links of which, for example, each or each second one serves as a carrier for the gripper 1. A gripper 1 thereby has an L-shaped gripper body 90 with a long limb and a short one, which is perpendicular thereto. A face side of the short limb of the L-shaped gripper body 90 is fastened on the drive body 82.

A first gripper jaw pair is arranged at a location of the gripper body 90, which lies opposite the face side of the short limb of the gripper body 90. The first gripper jaw pair is composed of a first gripper jaw 20 and a second gripper jaw 30. The gripper jaws 20, 30 are constructionally identical to the gripper jaws of the gripper 1 in FIG. 1 and are connected to the gripper body 90 in the same manner (i.e. mounted in recesses of the gripper body 90). The first gripper jaw 20 includes an actuation section 25 with a functional contour. The first gripper jaw pair extends or points in the direction of a longitudinal axis of the short limb of the gripper body 90, in the closed condition shown in FIG. 9. In other words, a longitudinal axis of an object 2 gripped by the first gripper jaw pair points in the direction of the longitudinal axis of the short limb of the gripper body 90.

A second gripper jaw pair is arranged on a face side of the long limb of the gripper body 90. The second gripper jaw pair is constructionally identical to the first gripper jaw pair and is likewise composed of a first gripper jaw 20 and of a second gripper jaw 30. Here too, the first gripper jaw 20 comprises an actuation element 25 with a functional contour. In the closed condition shown in FIG. 9, the second gripper jaw pair extends or points in the direction of a longitudinal axis of the long limb of the gripper body 90. In other words, a longitudinal axis of an object 2 gripped by the second gripper jaw pair points in the direction of the longitudinal axis of the long limb of the gripper body 90. Thus, the second gripper jaw pair is perpendicular to the first gripper jaw pair in the closed condition.

A first switch 91 and a second switch 92 are fastened, for example, on the guide channel 85 of the conveying installation 81. FIG. 9 shows the conveying installation 81 at an opening location S, since the grippers 1 can be opened by the switches 91, 92. The first switch 91 is arranged in a manner such that it can interact with the actuation section 25 of the first gripper jaw pair. The second switch 92 is arranged in a manner such that it can interact with the actuation section 25 of the second gripper jaw pair. The first switch 91 and the second switch 92 are both constructionally identical and are designed as rotatably mounted discs, whose radially outer lying side (thus the peripheral side of the discs) interacts with the actuation sections 25 as the case may be.

In FIG. 9, the first and second switches 91 and 92, respectively, are fastened in an activation position on the guide channel 85, in a manner such that with a movement of the drive body 82 through this guide channel 85, they always interact with all respective actuation sections 25, which are moved past. This means that the switches 91, 92 interact with all respective actuation sections 25, which are present on grippers 1 fastened on this drive body 82, when these respective actuation sections 25 are moved past the switches 91 and 92 by way of a movement of the drive body 82.

"Respective actuation sections 25" is to be understood in that in FIG. 9, every switch 91, 92 is designed and/or arranged such that these switches 91, 92, in each case, only interact with a certain selection of actuation sections 25 (thus so-called respective actuation sections 25). This, in the present example in FIG. 9, is realised by a separate spatial arrangement of the actuation sections 25 of the first and of the second gripper jaw pair and the separate arrangement of the first switch 91 and the second switch 92.

Alternatively, the switches 91, 92 can also be fastened on the guide channel 85 in a manner such that the switch means only temporarily assume the activation position described above and temporarily assume a non-activation position, in which the switches 91, 92 do not interact with the respective actuation sections 25, which are moved past. An interaction of the switches 91, 92 with the respective actuation sections 25, which are moved past, can, for example, be switched on and off in this manner. The switches 91, 92 can be activated and deactivated by a control device, for example.

FIG. 10 and FIG. 11 both show a cross section through the conveying installation 81, which is already shown in FIG. 9. A first cross section, in which an object 2 is gripped by the first gripper jaw pair of the gripper 1, is shown in FIG. 10. The longitudinal axis of the object 2 gripped by the first gripper jaw pair points in the direction of the longitudinal axis of the short limb of the gripper body 90. The longitudinal axis of the object 2 gripped by the first gripper jaw pair is thereby perpendicular to a direction of the longitudinal axis of the long limb of the gripper body 90.

A second cross section, in which an object 2 is gripped by the second gripper jaw pair, is shown in FIG. 11. The longitudinal axis of the object 2 gripped by the second gripper jaw pair of the gripper 1 points in the direction of the longitudinal axis of the long limb of the gripper body 90. The longitudinal axis of the object 2 gripped by the second gripper jaw pair is thereby perpendicular to the direction of the longitudinal axis of the short limb of the gripper body 90. Thus, the longitudinal axis of the object 2 gripped by the second gripper jaw pair is perpendicular to the direction of the longitudinal axis of an object 2 gripped by the first gripper jaw pair.

In the shown embodiments, the longitudinal axis of a gripped object 2 extends in each case in the same direction, in which the gripper jaws extend in each case, which is to say parallel to this direction. That which has been said with regard to the direction with respect to the longitudinal axis of a gripped object 2 also applies with respect to the directions, in which the gripper jaws extend.

Figure 12:
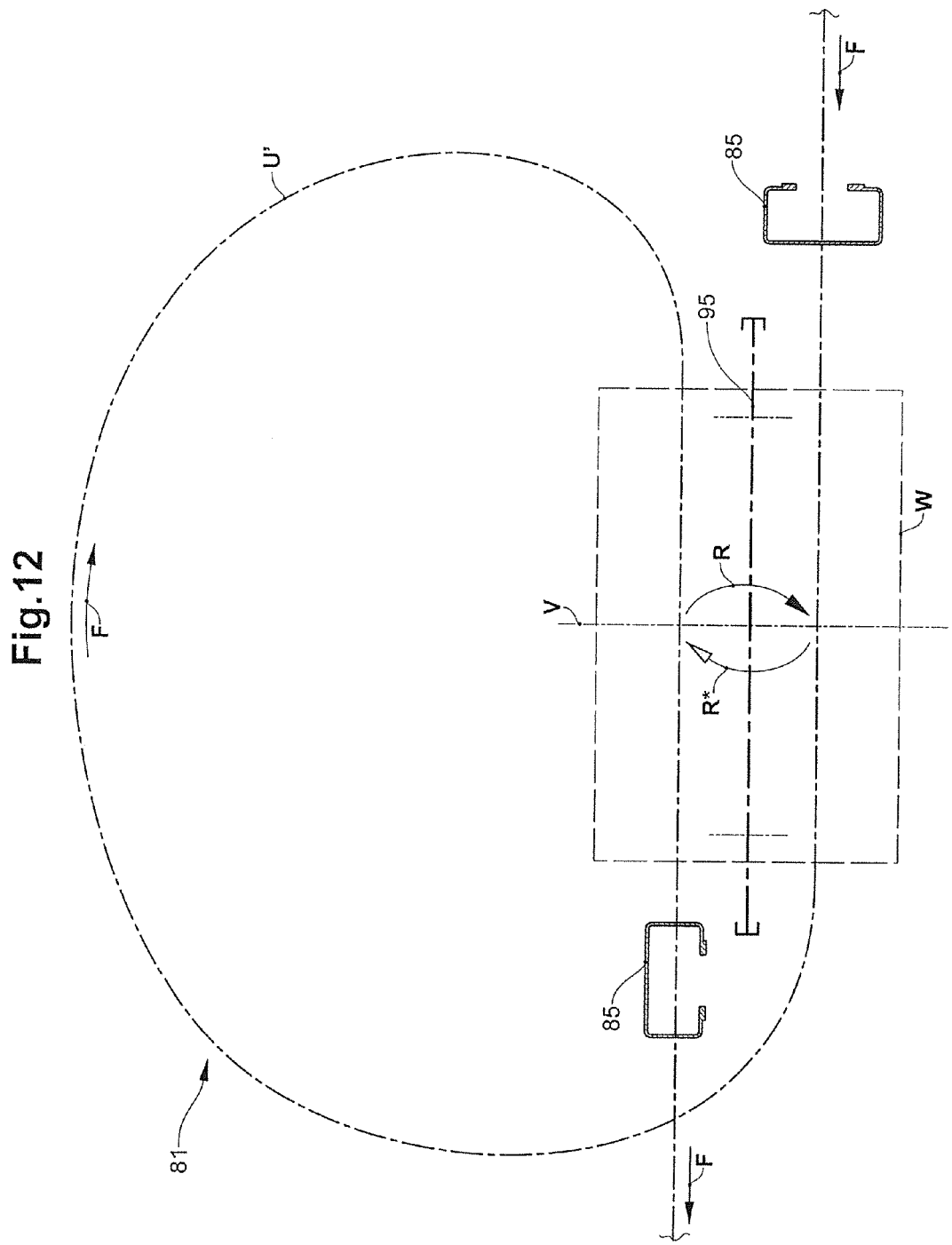
FIG. 12 a part of the circulating path of the conveying installation of FIG. 9.

FIG. 12 shows a part of the circulating path U' of the conveying installation 81 of FIG. 9, in a plan view. The conveying direction F is drawn in and runs from the right to the left with a correspondingly opposite conveying direction F in the region of a loop of the circulating path U'. The guide channel 85 (and, thus, also the drive body 82 and the grippers 1 fastened thereon) rotates about 90 degrees about a rotation axis parallel to the conveying direction F, in the course of the loop of the circulating path U'. A region of the circulating path U' after the beginning of the loop and a region of the circulating path U' before the end of the loop, run parallel to one another. These regions define a transfer zone W. A revolving apparatus 95 is arranged in the transfer zone W between the regions of the circulating path U', which run parallel, and parallel to this.

The gripper 1 enters into the transfer zone W for the first time (for a first run-through) from the right edge of FIG. 12 in the conveying direction F, when the first gripper pair of the gripper 1 lies in the plane of the drawing of FIG. 12, as is schematically represented in FIG. 12 by the orientation of the drawn cross sections of the channels 85. The gripper 1, lying downstream of the loop of the circulating path U' in the conveying direction enters into the transfer zone W for a second time (for a second run-through) in the conveying direction F from the right edge in FIG. 12. The orientation of the gripper 1 remains unchanged on crossing through or running through the transfer zone, with the first run-through as well as with the second-run-through.

An object 2 that is gripped by a second gripper jaw pair of a gripper 1 in the transfer zone W is transferred or brought into a first gripper jaw pair of another gripper 1. The transfer of the object 2 can be effected in a transfer direction R (represented by an arrow with an empty tip), for example, by a transfer mechanism 93, and for a simpler representation, this is shown not in FIG. 12, but in FIG. 13 in a cross section through the section plane V drawn in FIG. 12.

If an object 2 is gripped by a gripper 1 by the second gripper jaw pair and conveyed along the circulating path U' in the conveying direction F, then the object runs through the transfer zone W a first time. The object 2 then also runs through the loop of the circulating path U' for the first time. The object 2 subsequently runs through the transfer zone W for the second time and, with this second run through the transfer zone W, is transferred from the second gripper jaw pair of the gripper 1 in the transfer direction R into a first gripper jaw pair of a further gripper 1, wherein this further gripper runs through the transfer zone W for the first time. The object, which is now gripped by the first gripper jaw pair of the further gripper 1, now runs through the loop of the circulating path U' for the second time and finally runs through the transfer zone W a third time, without however thereby being transferred again into another gripper 1.

An object 2, which is conveyed by the conveying installation 81, runs through the loop of the circulating path U' twice in this manner, whereas the gripper 1 runs through the loop only once. The object 2 covers double the path of the loop in the circulating path U'. This can advantageously be used in order to somewhat shorten or simplify conveying installations. This saves costs, space and time (such as with the maintenance, retrofitting and/or cleaning). The loop can thereby assume any shape or fashion. The length of the loop can also be varied.

For example, a cooling section in half as long a loop (thus in a loop with half the path distance in comparison to a loop without transfer) can be formed by way of the transfer of the conveyed objects 2, without the cooling duration being shortened by way of this, given the same conveying speed. For example, a cleaning installation can also be run through twice, in order to apply the cleaning process twice, without however two cleaning installations, but only one cleaning installation being necessary for this. The same applies to all other processes or applications which are to be applied on the object 2 several times, such as irradiation with visible light, UV light, electromagnetic beams of other wavelengths and other ionising and/or non-ionising radiation. For example, a repeated heating and/or cooling or a repeated coating, painting and/or lacquering can also be advantageously carried out by the conveying installation 81.

Alternatively, the circulating path U' can run in a direction that is opposite to the drawn conveying direction F. Alternatively, the transfer can also be effected in a transfer direction R* which is opposite to the transfer direction R (indicated in the figures with an arrow with a bold tip). An object 2 that is gripped by a second gripper jaw pair of a gripper 1 is transferred into a first gripper jaw pair of a further gripper 1 already with the first run-through of the transfer zone W, due to a conveying opposite to the conveying direction F or by way of a transfer in the transfer direction R*. Since this further gripper 1 has already run through the loop of the circulating path U', the object 2 that is gripped by it does not run through the loop at all. The loop of the circulating path U' is thus jumped, which is to say bypassed or bridged by the object 2. This, for example, can serve for a re-gripping or repositioning of the object 2 relative to the grippers 1 of the conveying installation 81. Thus, for example, an object 2 can be gripped by a gripper 1 in horizontally aligned manner, transferred to a further (rotated) gripper and can be conveyed further in a vertically aligned manner after a rotating-back of the further gripper 1.

Optionally, the transfer mechanism 93 can be designed in a manner such that it can transfer objects 2 in the transfer direction R as well as in the transfer direction R* opposite to this.

A transfer mechanism 93 with regard to the stream of conveyed objects 2 represents a diverter (points) which, depending on the design and transfer direction R or R*, with a single run through the closed circulating path U' of the conveying installation, permits conveyed objects 2 to leave out or jump certain parts or sections of this closed circulating path of the conveying installation or to run twice or even more often through these parts or sections or to run through these parts or sections of the circulating path exactly only once (wherein in the latter case the transfer mechanism 93, for example, does not transfer the object 2).

Optionally, also several transfer mechanisms 93 can be arranged in a transfer zone W. Conveyed objects 2, for example, can also run three or more times through certain parts or sections of a closed circulating path of the conveying installation, by way of them being transferred twice or more in the transfer zone W.

Figure 13:
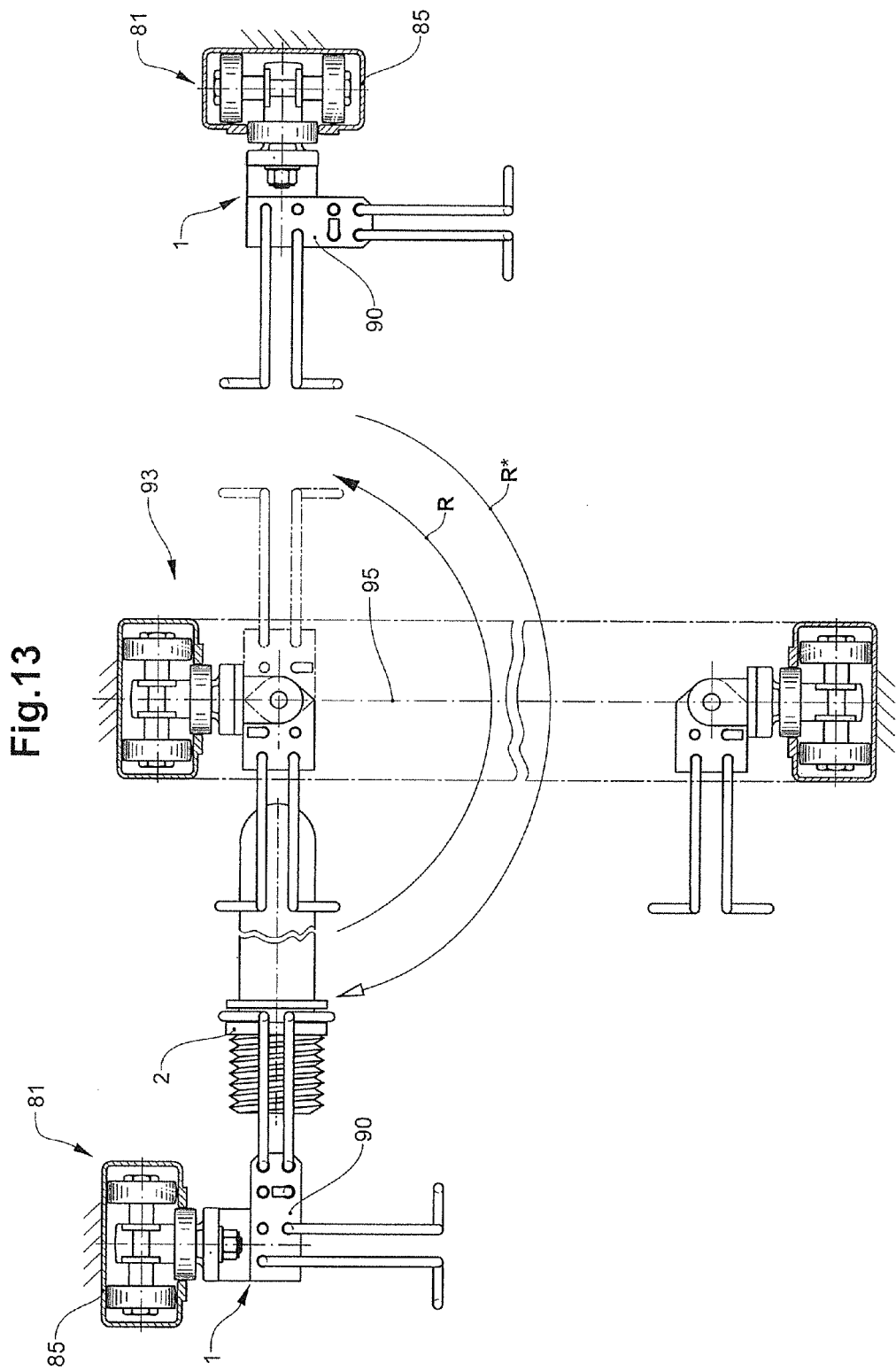
FIG. 13 a cross section through the circulating path of the conveying installation of FIG. 12.

FIG. 13 shows a cross section through the circulating path U' of the conveying installation 81 of FIG. 12. The cross section thereby runs in the transfer zone W along the section plane V-V drawn in FIG. 12. FIG. 13 shows the transfer mechanism 93. The transfer mechanism 93 includes a revolving apparatus 95 and transfer elements 94 moved along the revolving apparatus 95. The transfer elements 94 during the transfer along the revolving apparatus 95 move at the same speed in the same direction as the grippers 1 along the closed circulating path U'. A transfer element 94 at the left side of FIG. 13 grips an object 2, which is firstly gripped by a second gripper jaw pair of a gripper 1. Thereafter, this gripper 1 releases the object 2, and the transfer element 94 or the transfer mechanism 93 pivots the object 2 in the transfer direction R to a further gripper 1. This further gripper 1 grips the object 2 with its first gripper jaw pair. At the left side, the first gripper jaw pair can also hold a further object 2, or on the right side the second gripper jaw pair can also hold a further object 2 (not shown), depending on how the installation is operated.

The position of a gripped object 2 with respect to the gripper 1, for example, can also be important for a specific processing and, in particular, for certain processing stations. This is roughly the case with different orientations with different manufacturing and/or processing steps, for example with a manufacture in a vertical position and a processing in a horizontal position. An access, for example to the conveyed object 2 or a processing of this, can be simplified or rendered possible at all by way of bringing the gripped object 2 from a gripper 1 into a further gripper of the same circulating path, wherein the gripped object 2 changes its position with respect to the respective gripper 1.

Figure 14:
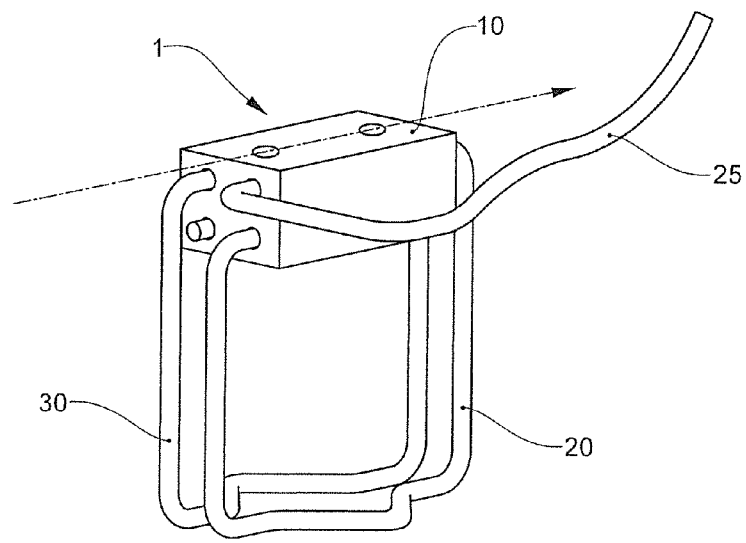
FIG. 14 a gripper with a control element which comprises a functional contour.

FIG. 14 as one embodiment for the at least partial achievement of the object according to a first aspect shows a gripper 1 with a control element 25, which has a functional contour. The gripper 1 has only one control element 25. The control element 25 deflects the gripper jaw 20. The other gripper jaw 30 is deflected by no control element.

Figure 15:
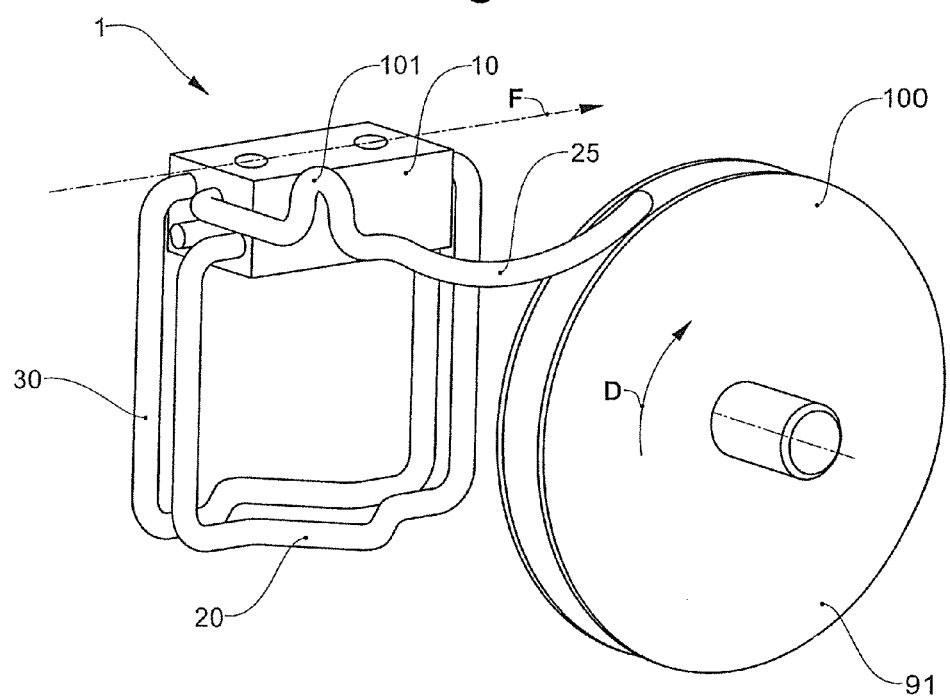
FIG. 15 a further gripper with a control element which has a functional contour, as well as associated switch means.

FIG. 15 shows a further gripper 1 with only one control element 25. This control element 25 also has a functional contour. Moreover, a switch 91 that interacts with the control element 25 when the gripper 1 is moved in the conveying direction F is shown in FIG. 15. The switch 91 is designed as a freely rotatably mounted wheel. The switch 91 rotates in the rotation direction D during the interaction with the control element 25. The control element 25 rotates the switch 91 in the rotation direction D on contact during the interaction. The switch 91 is not driven and is freely rotatable. A groove 100 is formed on a peripheral side of the switch 91. The groove 100 has a semicircular, concave cross section. The groove 100 serves for the secure receipt and guiding of the control element 25 during its interaction with the switch 91.

A lug 101 is formed on the control element 25, so that the switch 91 only interacts with a functional contour of the control element 25. The lug 101 is designed in a manner such that the functional contour of the control element 25 within the groove 100 can interact with the switch 91, without other parts than the functional contour of the control element 25 contacting the switch means 91, when leading the control element 25 past the switch 91. The lug 101 runs around the switch 91, seen in the conveying direction F, for example with a projection into a plane normal to the conveying direction F. The lug 101 is arranged on the control element 25 between the functional contour of the control element 25 and the gripper body 10.

Figure 16:
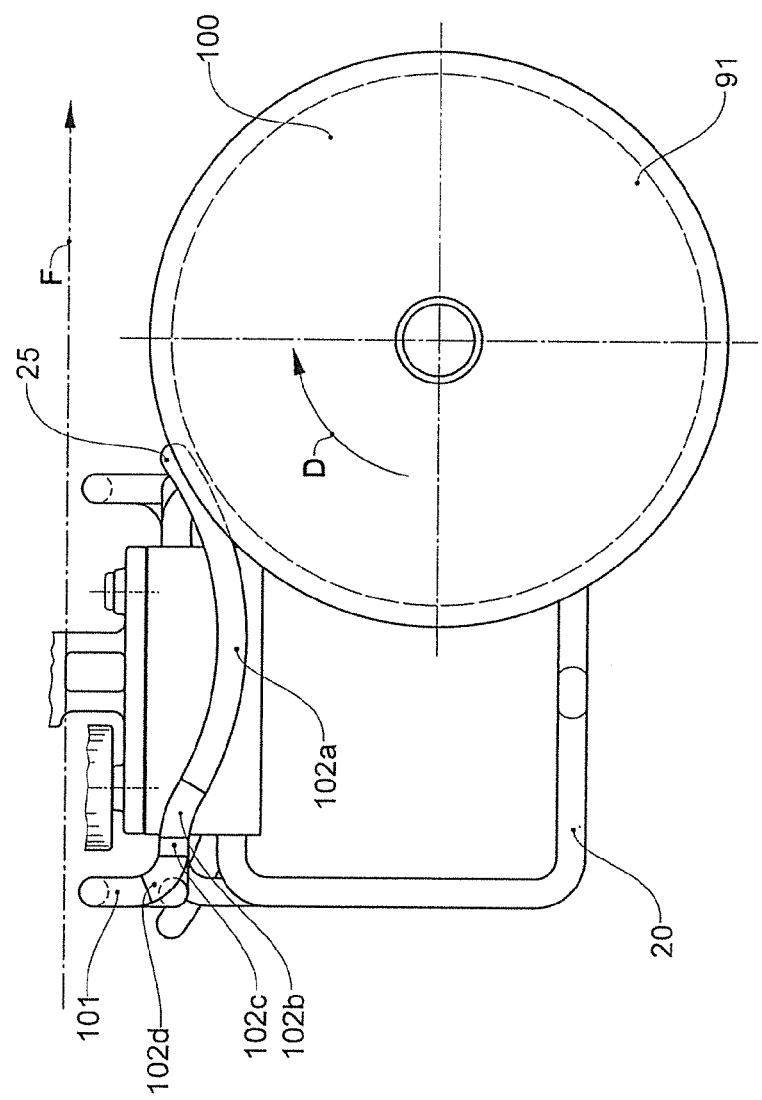
FIG. 16 the gripper and the switch means of FIG. 15, in a lateral view.

FIG. 16 shows the same gripper and the same switch as in FIG. 15, but shown in a lateral view. The functional contour of the control element 25 can be clearly recognised in the lateral view. The functional contour of the control element 25 includes four contour segments 102a-102d. The four different contour segments 102a-102d differ from one another by way of the radius of curvature and/or curvature direction.

The first contour segment 102a is located on a free end of the control element 25, which is remote from the gripper body 10, and includes a uniform curvature in the opposite direction to a curvature of the switch 91. The curvature of first contour segment 102a, by way of example, has roughly an equal radius of curvature as the peripheral side of the switch 91. The first contour segment 102a on interaction of the control element 25 with the switch 91 effects a deflection of the gripper jaw 20 with a uniformly increasing speed in the direction of its open condition, thus a gently accelerating opening movement of the gripper jaw 20.

The second contour segment 102b connects directly to the first contour segment 102a. The second contour segment 102b has a curvature opposite to the curvature of the first contour segment 102a, thus here in the curvature direction of the switch 91. A radius of curvature of the second contour segment 102b is three times smaller than the radius of curvature of the first contour segment 102a. The second contour segment 102b on interaction of the control element 25 with the switch 91 effects a deflection of the gripper jaw 20 with a uniformly reducing speed in the direction of its open condition, thus a soft braking opening movement of the gripper jaw 20.

The third contour segment 102c connects directly to the second contour segment 102b in the direction of the gripper bodies 10. The third contour segment 102c is designed in a straight manner. The third contour segment 102c on interaction of the control element 25 with the switch 91 effects a deflection of the gripper jaw 20 at a constant speed in the direction of its open condition, thus an opening movement of the gripper jaw 20 at a constant speed.

The fourth contour segment 102d in the direction of the gripper body 10 connects directly to the third contour segment 102c. The fourth contour segment 102d as is the case with the second contour segment 102b has a curvature in the curvature direction of the switch 91. A radius of curvature of the fourth contour segment 102d is four times smaller than the radius of curvature of the first contour segment 102a. The fourth contour segment 102d with the interaction of the control element 25 with the switch means 91 effects a deflection of the gripper jaw 20 with a uniformly reducing speed in the direction of its closed condition, thus a gently braking closure movement of the gripper jaw 20.

The radii of curvature of the contour segments 102a-102d have different values depending on the demands and desired deflection of the gripper jaw 20. Thus, for example, the radius of curvature of the first contour segment 102a can lie in a range of 5 mm to 100 mm, in particular in a range of 10 mm to 70 mm and in particular in a range of 15 mm to 50 mm. The first contour segment 102a can however also be designed in a straight line.

The radius of curvature of the second contour segment 102b can lie in a range of 5 mm to 100 mm, in particular in a range of 10 mm to 70 mm and in particular in a range of 15 mm to 50 mm. The second contour segment 102b can, however, also be designed in a straight manner.

The radius of curvature of the fourth contour segment 102d can lie in a range of 5 mm to 100 mm, in particular in a range of 10 mm to 70 mm and in particular in a range of 15 mm to 50 mm. The fourth contour segment 102d can however also be designed in a straight manner.

The third contour segment 102c can, however, also have a curvature. Thereby, the radius of curvature of the third contour segment 102c can lie in a range of 5 mm to 100 mm, in particular in a range of 10 mm to 70 mm and in particular in a range of 15 mm to 50 mm.

The lug 101 is arranged in a manner subsequent to the fourth contour segment 102d in the direction of the gripper body 10. The functional contour of the control element 25 is located at the free end of the control element 25, which is remote to the gripper body 10. The functional contour of the control element 25 is arranged in a leading manner in the conveying direction F. In other words, the functional contour of the control element 25, given a movement in the conveying direction F, leads with respect to a location, at which the control element 25 is connected to the gripper jaw 20. The functional contour of the control element 25, however, can also be arranged in a trailing manner. The functional contour of the control element 25 can also be arranged or designed in a leading as well as trailing manner.

Figure 17:
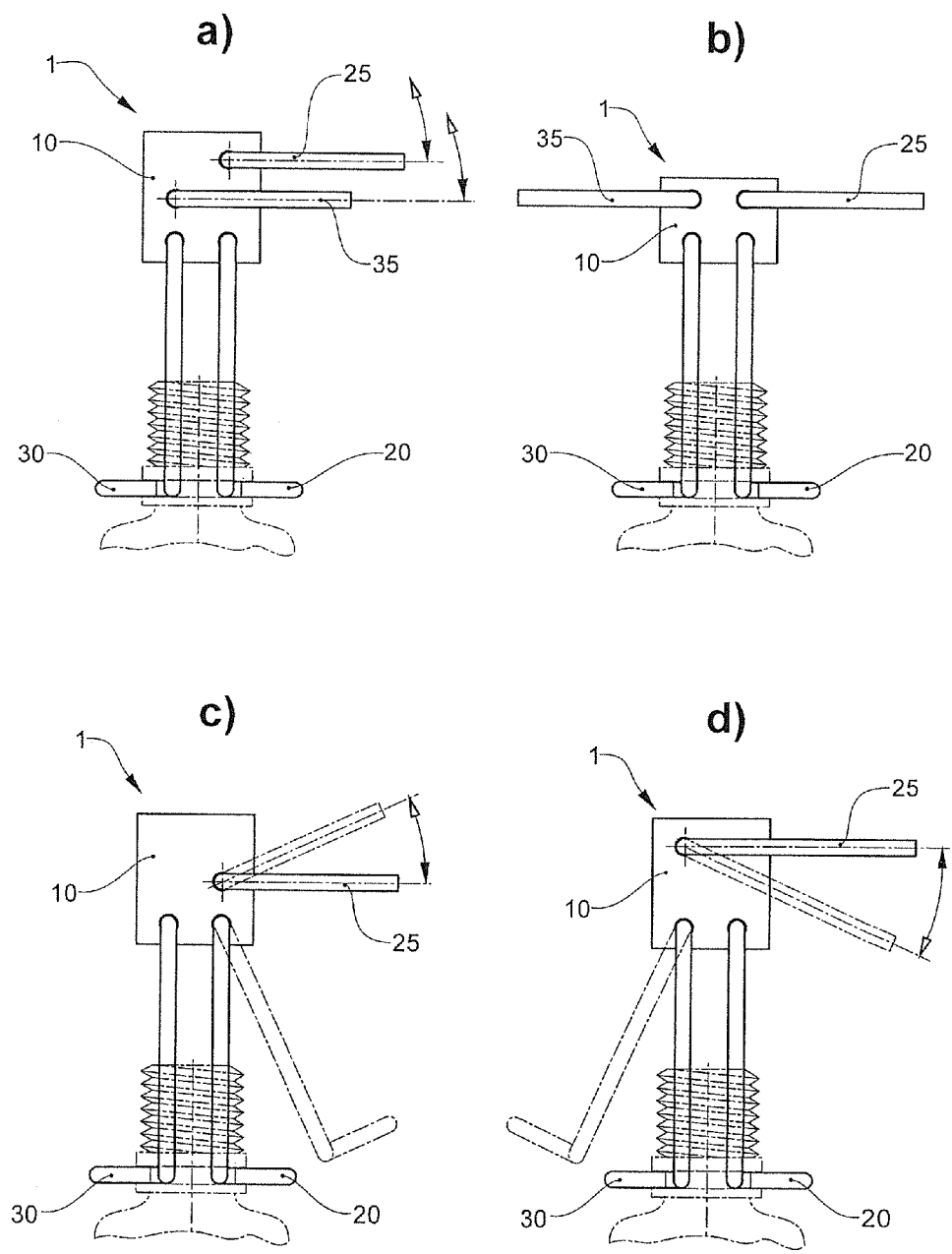
FIG. 17a-d grippers with differently arranged control elements.

FIG. 17a-d show grippers 1 with differently arranged control elements 25, 35. Directional details such as up, down, to the left and right relate to the plane of the drawing of the figures. The conveying direction F, which is not shown, points perpendicularly out of the plane of the drawing in FIG. 17a-d. FIG. 17a shows a gripper 1 that on the same side of the gripper body 10 includes a first control element 25 and a second control element 35 arranged above one another. The first control element 25 is arranged at the top and the second control element 35 is arranged at the bottom, wherein the first control element 25 is displaced slightly to the right relative to the second control element 35.

The first control element 25 acts upon the first gripper jaw 20 arranged at the right, and the second control element 35 acts upon the second gripper jaw 30 arranged on the left. The first control element 25 as well as the second control element 35 in the closed condition of the gripper jaws 20, 30 point in the same direction, more precisely to the right, and are moved in the same direction, here are rotated upwards in the counter-clockwise direction, on interaction with a switch means 91 for opening the gripper jaws 20, 30. The first gripper jaw 20, on opening, rotates to the right in the counter-clockwise direction, and the second gripper jaw 30 rotates to the left in the clockwise direction on opening.

FIG. 17b shows a gripper 1 that on the same side as the gripper body 10 includes a first control element 25 and a second control element 35 in a manner arranged next to one another. The gripper 1 in FIG. 17b is constructed the same as the gripper in FIG. 17a, apart from the arrangement of the two control elements 25, 35. The first control element 25 again acts upon the first gripper jaw 20, and the second control element 35 acts upon the second gripper jaw 30. Thereby, the first control element 25 in the closed condition of the gripper jaw 20 acts in a direction that is opposite to the direction in which the second control element 35 points in the closed condition of the gripper jaw 30. The first control element 35 here points to the right, and the second control element 35 to the left.

On interacting with a switch 91, the first control element 25 is rotated upwards in the counter-clockwise direction for opening the gripper jaw 20. The second control element 35 is rotated upwards in the clockwise direction, thus rotated in a direction different to the first control element 25, on interacting with a switch 91, for opening the gripper jaw 30. The first gripper jaw 20 on opening rotates to the right in the counter-clockwise direction, and the second gripper jaw 30 rotates in the clockwise direction to the left when opening.

FIG. 17c shows a gripper 1 which only comprises a first control element 25. The gripper 1 in FIG. 17c is constructed in the same manner as the grippers 1 in FIGS. 17a and 17b, but only includes a single, first control element 25. Thereby, the control element 25 in the closed condition of the gripper jaw 20 points to the right and interacts with the gripper jaw 20 arranged on the right. The first control element 25 is rotated upwards in the counter-clockwise direction on interacting with a switch 91, for opening the gripper jaw 20. The right gripper jaw 20 on opening rotates to the right in the counter-clockwise direction. The left gripper jaw 30 is not deflected by a control element.

FIG. 17d shows a gripper 1 that likewise comprises only a single, but however, the second control element 35. The second control element 35 acts upon the left gripper jaw 30. Thereby, the second control element 35 points to the right in the closed condition of the gripper jaw 30. The control element 35 on interacting with a switch 91 is rotated downwards in the clockwise direction for opening the gripper jaw 30. The gripper jaw 30 on opening rotates to the left in the clockwise direction. The right gripper jaw 20 is not deflected by a control element.

Figure 18:
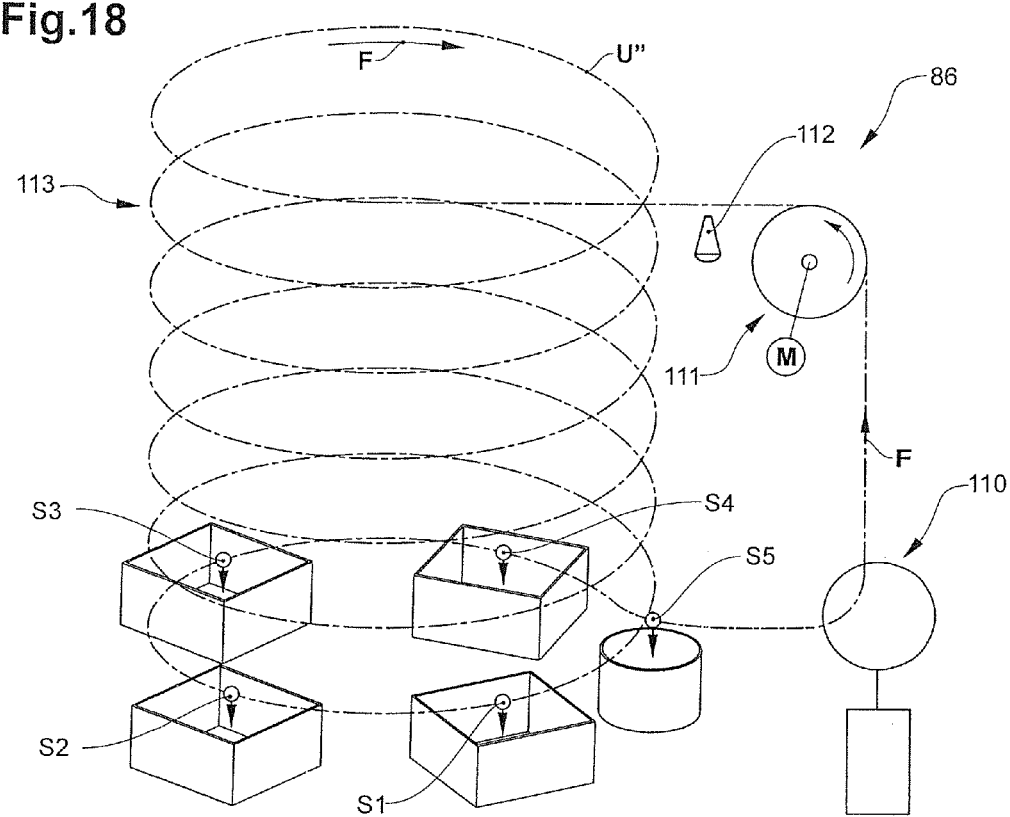
FIG. 18 a conveying installation with five opening locations.

FIG. 18 as one embodiment for the at least partial achievement of the object according to a second aspect includes a conveying installation 86 with five opening locations S1-S5. The grippers 1 and the objects 2 are not drawn in FIG. 18 for the purposes of a better overview. The grippers 1 move in the conveying direction F along a closed circulating path U'''. The grippers 1 grip the objects 2 at a filling station 110. The gripped objects 2 thereafter pass a drive 111 on conveying in the conveying direction. The drive 111 includes a motor M and drives the drive body 82, which is likewise not shown here and onto which the grippers 1 are coupled. The grippers 1 and the gripped objects 2, following in the conveying direction, thereafter pass a detection apparatus 112. The detection apparatus 112 includes a sensor that measures characteristics of the objects 2 and/or grippers 1 that are led past it. The detection apparatus 112 provides the conveying installation 86 with information with regard to the characteristics of the gripper 1 and/or the conveyed objects 2.

The gripped objects 2, subsequently to the detection apparatus 112 in the conveying direction F run through a cooling section 113. The cooling section 113 is designed in the shape of a helix. The grippers 1 one after the other pass a first opening location S1, a second opening location S2, a third opening location S3, a fourth opening location S4 and a fifth opening location S5 in the conveying direction F after running through the cooling section 113. All opening locations S1-S5 include a switch 91 of a different type, which are not shown here. The first opening location S1 and the second opening location S2 include a switch 91 of the first type. The third opening location S3 and the fourth opening location S4 include a means 91 of the second type. The fifth opening location S5 includes a switch 91 of the first type as well as a switch 91 of the second type. The switch 91 of the first four opening locations S1-S4 can thereby be activated and deactivated by a control device. The switch 91 of the fifth opening location S5 are designed in a control-device-free manner, i.e. free of control devices. The switch 91 of the fifth opening location S5 thus interact with all respective control elements 25 that are led past.

The objects 2 that are gripped by the grippers 1 can now be released or ejected at the opening locations S1-S5 by way of an opening of the grippers 1. Thereby, those grippers 1 whose control elements interact with switch 91 of the first type can be opened at the first opening location S1, the second opening location S2 and the fifth opening location S5. Those grippers 1 whose control elements interact with switch 91 of the second type can be opened at the third opening location S3, the fourth opening location S4 and the fifth opening location S5.

The fifth opening location S5 serves as an ejection location for rejection. Gripped objects, whose characteristics have an inadequate quality according to the information of the detection apparatus 112, are ejected at the fifth opening location S5. For this, the switch 91 of the respective type in the first four opening locations S1-S4 are deactivated by the control device. The gripped object of inadequate quality thus reaches the fifth opening location S5 and is ejected there, since all grippers 1 are opened at the fifth opening location S5. The control-device-free design of the switch 91 at this location also prevents the gripped objects 2 from passing the filling station 110. In other words, the grippers 1 at all events are emptied at the fifth opening location S5.

If the gripped objects 2 are not considered as rejects, then they are released or ejected at one of the four first opening locations S1-S4. The objects 2 are ejected at different opening locations S1-S5 depending on the design of the grippers 1 which grip the objects 2. If a gripper 1 includes a control element 25 that interacts with a switch 91 of the first type, then an object 2 of sufficient quality is ejected at the first opening location S1 or the second opening location S2. If the gripper 1 includes a control element 25 that interacts with a switch 91 of the second type, then an object 2 of sufficient quality is ejected at the third opening location S3 or fourth opening location S4.

Advantageously, objects 2 of a first sort are gripped by grippers 1 that are opened by the switch 91 of the first type, and objects 2 of the second sort are gripped by grippers 1 that are opened by the switch 91 of the second type, if for example two different sorts of objects 2 are gripped by the grippers 1 in the filling station 110. Objects 2 of a different sort can be sorted in this manner Objects 2 of the first sort are ejected at the first opening location S1 and the second opening location S2, and objects 2 of the second sort are ejected at the third opening location S3 and the fourth opening location S4.

The grippers 1 are typically arranged on the drive body 82 in a defined sequence, depending on whether the control elements 25 of the grippers 1 interact with the switch 91 of the first or second type. For example, grippers 1 are arranged in an alternating manner, so that the control elements 25 of the grippers 1 interact alternately with the switch 91 of the first or second type. In another example, the grippers 1 are arranged in a grouped manner alternately one after the other, in a manner such that a first group of grippers 1 interacts with the switch 91 of the first type, and the adjacent groups of grippers 1 interact with the switch 91 of the second type. The conveying installation 86 is fixedly programmed so to say, by way of this arrangement of the grippers 1. The conveying installation 86 in this case includes a fixedly predefined pattern, according to which it is specified, at which opening locations S1-S5 which grippers 1 can be opened and at which they cannot be opened. Objects can be sorted given a corresponding filling of the grippers 1 by the filling station 110. The advantage of a conveying installation 86, which is fixedly programmed, in such a manner lies in the low manufacturing and maintenance costs and a simple design and simple manner of functioning.

Alternatively, also all grippers 1 can be capable of interacting with all the switches 91, and the switched or activatable and de-activatable switch 91 in each case can achieve a targeted opening of each gripper 1. A sorting of objects 2 is also possible without any problem in this manner, but however necessitates a more complicated design and functioning manner of the conveying installation 86, which also manifests itself in a higher maintenance and manufacturing effort and corresponding costs.

Containers that collect the ejected objects 2 can be arranged below the opening locations S1-S5 for example. The respective switch 91 can be deactivated if a container below the opening locations S1 is full, and the container S2 can be filled given activated respective switch 91 and vice versa. The same also applies to the third opening location S3 and the fourth opening location S4.

Figure 19:
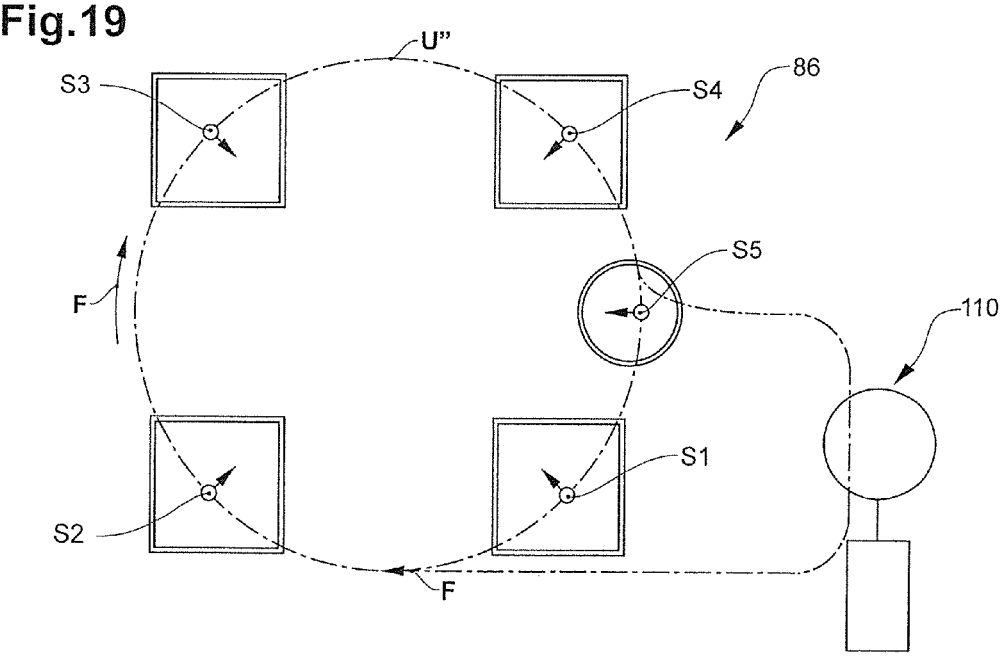
FIG. 19 the conveying installation of FIG. 18, from above.

FIG. 19 shows the conveying installation 86 from FIG. 18 from above.

Figure 20:
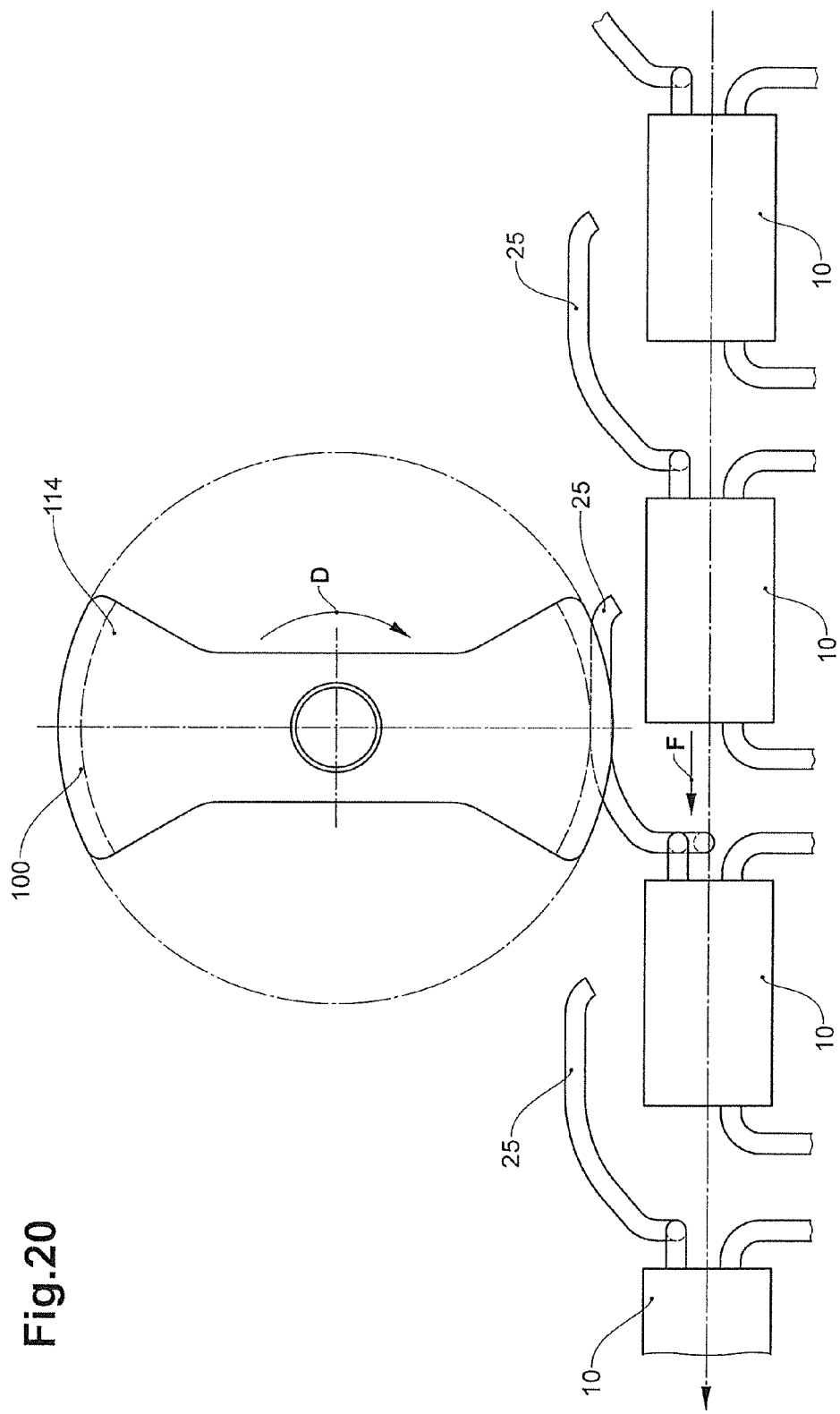
FIG. 20 a switch means with recesses.

FIG. 20 shows a switch 114 with recesses. The switch 114 is designed a rotatable wheel with recesses. A groove 100 with a semicircular, concave cross section is formed on the peripheral side of the wheel. The switch 114 rotates in the rotation direction D at such a speed that the grove 100 moves at the same speed as the grippers 1 that are conveyed past the switch 114. The recesses of the switch 114 run from the peripheral side of the wheel in the direction of its rotation axis and are dimensioned and arranged in a manner such that control elements 25 of led past grippers 1 find space in the recesses in a contact-free manner Two recesses are shown in FIG. 20, and these lie radially opposite one another and each provides space for a control element 25. Two grooves 100 are located between the two recesses, wherein each groove 100 along the peripheral side of the switch 114 is dimensioned sufficiently large, in order to interact with exactly one control element 25. Four grippers 1 are conveyed past the switch 114 in the conveying direction F with a complete revolution of the switch 114 in the rotation direction D, wherein the switch 114 only interacts in an alternating manner with every second gripper 1.

Different sizes and arrangements of recesses in the switch 114 can be formed depending on the demands on the conveying installation 86 and depending on the number of types of switches. For example, the switch 114 can be designed which only interact with the control elements 25 of each third gripper 1 led past. Or, for example, each third gripper 1 led past does not interact with the control elements 25. Essentially, infinite temporal patterns of the interaction or patterns in the sequence of the interaction can be produced by way of a suitable arrangement and size of the recesses.

FIG. 21*a-f* show schematically represented arrangements of a switch 115 along a circulating path U''' of a conveying installation 87. These are alternative arrangements to the conveying installations 80, 81, 86 that are described above and according to circumstances can at least partly be transferred to these conveying installations 80, 81, 86. The conveying installation 87 can assume different shapes and designs and here is only represented schematically and in a greatly simplified manner, wherein also not all components are shown. FIG. 21*a-f* can also be considered as a detail of a conveying installation 87, in order to represent basic manners of functioning and principle courses in parts of the conveying installation 87.

It is likewise the case for the circulating path U''' that it can assume different shapes and lengths and that in each case only one detail is shown in FIG. 21*a-f*. Alternatively, FIG. 21*a-f* could also be considered as a schematic representation of independent and functionally capable conveying installations 87 that have no further components and functions on this schematic level. The switch 115 can be designed in different manners, be of a different type and/or be activatable and de-activatable by control devices or be free of control devices.

FIG. 21*a* shows a conveying installation 87 with a circulating path U''' and eight switches 115. Four of the switches 115 are of a first type and are arranged in the plane of the drawing of FIG. 21*a* above the circulating path U''' on a level A. The four other switches 115 are of the second type and in the plane of the drawing of FIG. 21*a* are arranged below the circulating path U''' on a level B. The conveying direction F runs from the left to the right. The switches 115 are arranged on both levels A and B to the very left of the circulating path U''', at the height of the filling station 110, so that a gripper 1 conveyed past it is opened, the filling station 110 can equip the opened gripper 1 with an object 2 and the gripper 1 grips the object 2.

The gripper 1 is conveyed past a fifth opening location S5 subsequently to the filling station 110 in the conveying direction F, at the height of which opening location in the circulating path U''' switches 115 are likewise arranged on both levels A and B. These switches can be activated and deactivated by a control device. Rejects, for example, can be ejected in a targeted manner at the fifth opening location S5 in this manner, for example on account of information of a detection apparatus 112, which is not represented here. This, for example, can be arranged subsequently to the filling station 110 in the conveying direction. The first opening location S1, then the second opening location S2, thereupon the third opening location S3 and finally the fourth opening location S4 follow the opening location S5 in the conveying direction F.

Switches 115 are only arranged on the level A at the height of the first opening location 51 and the second opening location S2 on the circulating path U'''. Thus only grippers 1 whose control elements 25, 35 interact with the switch 115 of the first type are opened at the first opening location 51 and the second opening location S2. In contrast, switches 115 are only arranged on the level B at the height of the third opening location S3 and the fourth opening location S4. Thus only grippers 1 whose control elements 25, 35 interact with the switch 115 of the second type are opened at the third opening location S3 and the fourth opening location S4. If the grippers 1 of the conveying installation 87 are accordingly charged in the filling station 110 (thus a first sort of objects 2 in the grippers 1, which interact with the switch 115 of the first type and a second sort of objects 2 in the grippers 1, which interact with the switches 115 of the second type) the conveyed objects 2 can be sorted and in particular rejects can be sorted out in a targeted manner.

The switches 115 of the first four opening locations S1-S4 can be activated and deactivated by control devices. A maximal flexibility of the conveying installation 87 is ensured in this manner. The switches 115 at the height of the filling station 110 are designed without a control device. If the grippers 1 must be emptied after a singular run through all five opening locations S1-S5, then this on the one hand can be ensured by way of a suitable programming of the control device. On the other hand, the switches 115 of the second opening location S2 and of the fourth opening location S4 can also be designed without a control device, by which means the conveying installation 87 can be designed in a simpler and less expensive manner.

The manner of functioning of the conveying installation 87 in FIG. 21*a* is basically comparable to the manner of functioning of the conveying installation 86 in FIGS. 18 and 19, apart from the fact that the fifth opening location S5 is arranged differently with respect to the conveying direction F.

The same conveying installation 87 as in FIG. 21*a* is basically shown in FIG. 21*b*, apart from the fact that the level B is likewise arranged above the circulating path U''' in FIG. 21*b*. The level B in FIG. 21*b* thereby lies below the level A. The level B has a smaller distance to the circulating path U''' than the level A. Switches 115 on the levels A and B differ by the different distances to the circulating path U'''.

A conveying installation 87 with six switches 115 of the same type is represented in FIG. 21*c*. The six switches 115 all lie on the same level A. The first opening location S1, then the second opening location S2, then the third opening location S3, thereupon the fourth opening location S4 and finally the fifth opening location S5 are subsequent to the filling station 110 in the conveying direction F, at the height of which filling station 110 a switch 115 free of a control device is arranged. The switches 115 of the first four opening locations S1-S4 can be activated and deactivated by control devices. The switches of the fifth opening location S5 is designed without control device, in order to ensure an emptying of the grippers 1 after running through all five opening locations S1-S5. Alternatively, the switches of the fifth opening location S5 can, however, also be activated and deactivated with a control device, and the emptying is ensured by a suitable programming A conveying installation 87 as is represented in FIG. 21*c* is significantly more flexible than the conveying installations in FIG. 21*a* and FIG. 21*b*, but also more complicated and costly in construction, set-up, programming, maintenance and servicing.

Figure 21D:
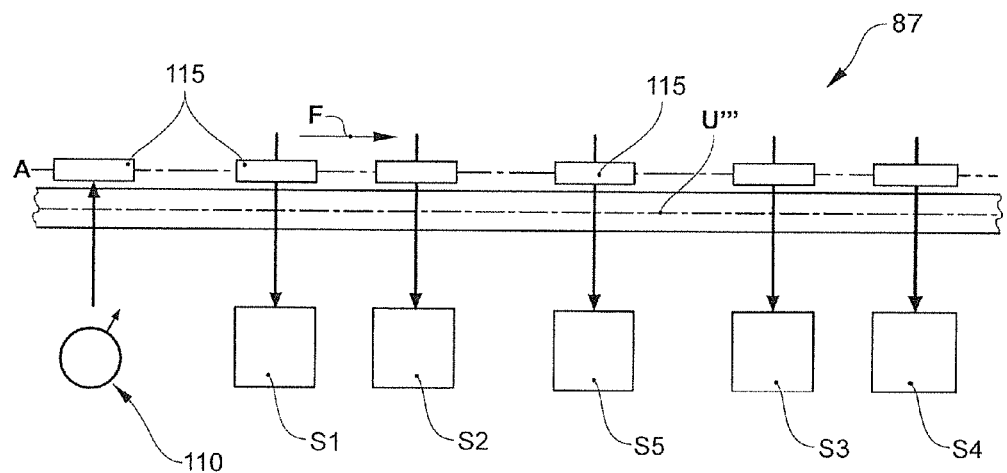

FIG. 21*d* shows a conveying installation 87 analogously to FIG. 21*c*, wherein only the fifth opening location S5 is arranged differently in the conveying direction. The fifth opening locations S5 in the conveying direction F is located subsequently to the second opening location S2 and in the conveying direction F is upstream of the third opening location S3, in the conveying installation 87. The switches 115 of the fifth opening locations S5 can be activated and deactivated by a control device, since all the switches 115 here also lie on the same level A as in FIG. 21c. If the switches 115 of the fifth opening location S5 were to be free of a control device, it would interact with all grippers 1 that are conveyed past, and all grippers would be emptied at this location of the circulating path U'. Thus no object 2 would reach the third opening location S3 or the fourth opening location S4. In this arrangement, the switches 115 of the fourth opening location S4 can be designed in a control-device-free manner, in order to ensure an emptying of the grippers 1 after a singular run through the five opening locations S1-S5. This also simplifies the conveying installation 87 with all advantages which are mentioned further above.

Figure 21E:
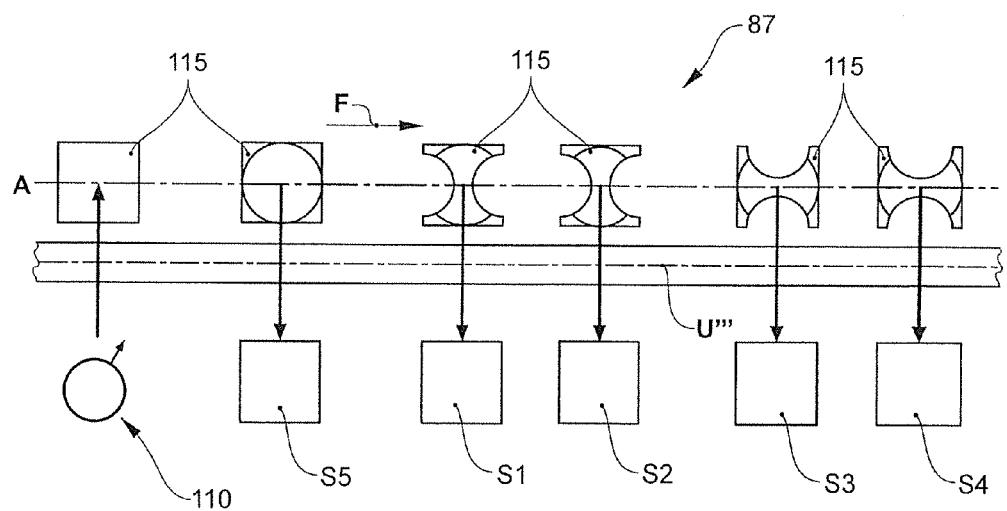

FIG. 21e shows a conveying installation 87 with six switches 115 of a different type, which however are arranged on the same level A. The switches 115 are partly with recesses as is described further above, so that these switches 115 alternately interact with each second control element 25, which is conveyed past. A filling station 110 with a switch 115 free of a control device is firstly arranged in the conveying direction F. The fifth opening location S5 with a switch 115 likewise free of a control device is arranged subsequently in the conveying direction F. Subsequent to this, in the conveying direction are firstly the first opening location 51, then the second opening location S2, thereafter the third opening location S3 and finally the fourth opening location S4. Thereby, the four first opening locations S1-S4 comprise switches 115 with recesses.

The switch 115 of the first opening location 51 and of the second opening location S2 are synchronised in a manner such that these interact with the control elements 25 of the same grippers 1. The switch 115 of the third opening location S3 and of the fourth opening location S4 are likewise synchronised in a manner such that these interact with the control elements 25 of the same grippers 1, wherein these are the control elements 25 of the grippers 1, with which the switch 115 of the first opening location 51 and of the second opening location S2 do not interact. The switch 115 of the five opening locations S1-S5 can be activated and deactivated by control devices. A maximal flexibility of the conveying installation 87 is ensured in this manner. The switch 115 of the filling station 110 is designed in a control-device-free manner. If the grippers 1 after a singular run through all fifth opening locations S1-S5 must be emptied, then on the one hand this can be ensured by a suitable programming of the control device. On the other hand, the switch 115 of the second opening location S2 and of the fourth opening location S4 can be free of a control device, by which means the conveying installation 87 can be designed in a simple and more economical manner.

FIG. 21f shows the same conveying installation 87 as FIG. 21b, wherein a sixth opening location S6 as well as a seventh opening location S7 subsequent to this are yet arranged subsequent to the fourth opening location S4 in the conveying direction F. The conveying installation moreover includes an additional level C above the level A. The sixth opening location S6 and the seventh opening location S7 each have a switch 115 of a third type, wherein these switches 115 of the third type are arranged on the level C. The level C has a greater distance to the circulating path U''' than the levels B and A, and differs from these by way of this. With this, it is to be illustrated that the conveying installations 87 are not limited to only two levels, but can also have three or more levels. Switches 115 of one and/or several types can be arranged on each level. The conveying installation 87 can be applied in a flexible and comprehensive manner in this way.

Figure 22:
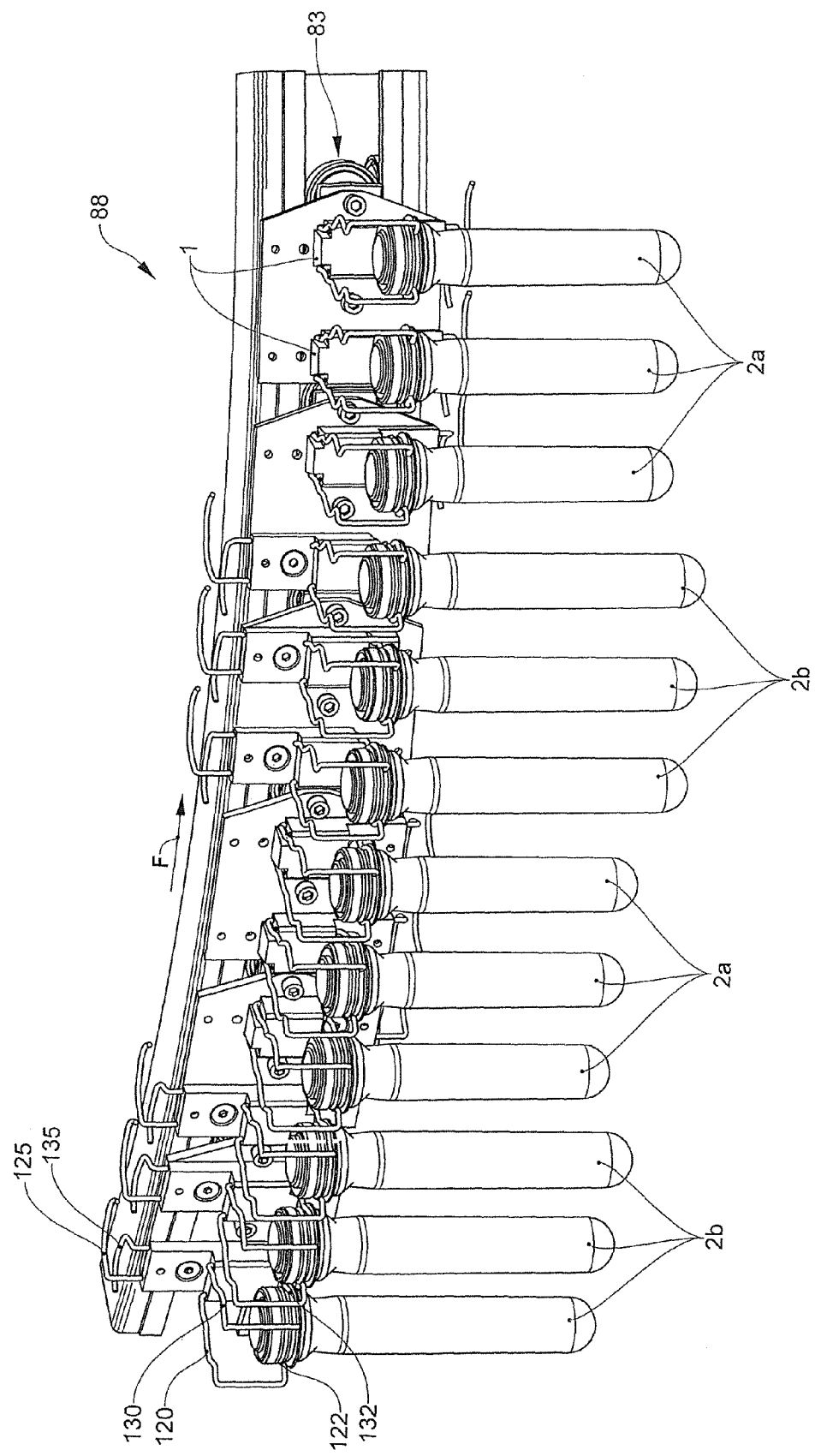
FIG. 22 a part of a conveying installation for conveying groups of objects of the same sort, said groups engaging over the conveying body.

FIG. 22 according to a third aspect shows a part of a conveying installation 88 for conveying groups of objects 2a, 2b of the same sort, wherein groups of objects 2a of a first sort alternate with groups of objects 2b of a second sort in the conveying direction F. The conveying installation 88 includes a drive body 83 having several members.

The groups of objects 2a of a first sort and the groups of objects 2b of a second sort reach beyond individual members of the drive body 83.

A member of the drive body 83 each include two grippers 1, each with a gripper jaw pair, in FIG. 22. The groups of the first sort of objects 2a and of the second sort of objects 2b each include three objects 2a, 2b.

A gripper jaw pair includes two gripper jaws 120, 130 each with a control element 125, 135. A control element 125 is arranged in a leading manner in the conveying direction F, and a control element 135 is arranged in a trailing manner in the conveying direction F. The control elements 125, 135 of the grippers 1 are designed in a manner such that they can each interact with respective switches, which are different from one another.

The control elements 125, 135 of the different groups of objects of the same sort are arranged on different sides of the drive body 83. The control elements 125, 135 of the groups of objects 2a of the first sort are arranged below the drive body 83, and the control elements 125, 135 of the groups of objects 2b of the second sort are arranged above the drive body 83.

The control elements 125, 135 of the different groups of objects 2a, 2b of the same sort in each case interact only with corresponding and specific switches, which are different according to the group. Each group of objects 2a, 2b of the same sort have their own switches for the control elements 125, 135 of the individual group.

The grippers 1 of FIG. 22 grip the objects laterally and not from above, i.e. the clamping region 122, 132 of the gripper jaws 120, 130 is arranged transversely to the axes A1, A1', A2, A2' of the gripper jaws 120, 130 and not parallel thereto, in contrast to the grippers 1 of the preceding figures.

The grippers 1 of FIG. 1-7, 9-11, 14-17, 22 or their generalisations and/or individual features and/or constituents of these grippers 1 or their generalisations can also be combined with one another. The conveying installations 80, 81, 86, 87 of FIGS. 8, 12-13, 18-22 or their generalisations and/or individual features and/or constituents of these conveying installations 80, 81, 86, 87 can be combined with one another.

The invention claimed is:

1. A gripper for the gripping and held conveying of objects, with a first gripper jaw and with a second gripper jaw, which can assume an open and a closed condition relative to one another and onto which a restoring force in the direction of the closed condition acts and which can exert a clamping force onto the object to be gripped, and with at least one control element that acts upon the first gripper jaw and/or the second gripper jaw, wherein the control element is designed as a cam guide that comprises a functional contour with at least one arcuate contour segment and that is capable of interacting with a switch;

wherein the functional contour of the control element comprises a first contour segment whose functional contour effects a release of a clamping force of at least one gripper jaw at a first speed, and a second contour segment whose functional contour effects an opening of the at least one gripper jaw at a second speed, wherein the opening of the at least one gripper jaw is temporally successive to the release of the clamping force of the at least one gripper jaw and wherein in particular the second speed is greater or lower than the first speed.

2. The gripper according to claim 1, wherein the functional contour of the control element comprises at least the first and second contour segments whose functional contour in the region at the beginning and/or a region at the end of a force action upon the control element effects a continuous increase or a continuous reduction of the speed of the deflection of at least one gripper jaw.

3. The gripper according to claim 1, wherein the functional contour of at least one of said first and second contour segment takes into account physical changes of the control element in its shaping given a force action upon the control element, and in particular with regard to its shaping takes into account a bending of the control element given a force action upon the control element.

4. The gripper according to claim 1, wherein the control element is made of a wire-like or tubular material.

5. The gripper according to claim 1, wherein the control element is designed in a single-part manner with the associated first or second gripper jaw.

6. The gripper according to claim 1, wherein the functional contour of the control element lies essentially in one plane.

7. A device comprising a gripper according to claim 1, and the switch, wherein the switch comprises a wheel, which interacts with the functional contour of the control element.

8. The device according to claim 7, wherein the switch is designed as a wheel with a groove on a peripheral side thereof.

9. A gripper for the gripping and held conveying of objects, with a first gripper jaw and with a second gripper jaw, which can assume an open and a closed condition relative to one another and onto which a restoring force in the direction of the closed condition acts and which can exert a clamping force onto the object to be gripped, and with at least one control element that acts upon the first gripper jaw and/or the second gripper jaw, wherein the control element is designed as a cam guide that comprises a functional contour with at least one arcuate contour segment and that is capable of interacting with a switch; and wherein the functional contour of the control element comprises a first contour segment, whose functional contour effects a closure of at least one gripper jaw at a first speed, and a second contour segment whose functional contour effects an application of a clamping force of the at least one gripper jaw at a second speed, wherein the application of the clamping force of the at least one gripper jaw is temporally successive to the closure of the clamping force of the at least one gripper jaw and wherein in particular the second speed is smaller or larger than the first speed.

10. A conveying installation with a plurality of grippers that are movable along a circulating path, wherein each gripper comprises at least one first gripper jaw, at least one second gripper jaw and at least one control element, and the at least one control element interacts with a switch for targeted opening of the first and/or second gripper jaw, wherein the conveying installation along the circulating path comprises at least one first opening location with a first type switch and a second opening location with a second type switch, and wherein each gripper of the conveying installation comprises at least one control element that is configured in a manner such that it either interacts with the first type switch or the second type switch;

wherein each of the plurality of grippers comprise an individually controllable first gripper jaw and an essentially constructionally identically designed second gripper jaw and first and/or second control elements that are assigned to these, and with first and second type switches that interact with the first and second control elements, respectively, for targeted opening of the first and/or second gripper jaw.

11. The conveying installation according to claim 10, wherein the conveying installation along the circulating path comprises at least one detection apparatus, which is designed in order to provide the conveying installation with information on the grippers and the gripped objects.

12. The conveying installation according to claim 10, wherein the conveying installation along the circulating path comprises a further opening location with the first and second type switch.

13. The conveying installation according to claim 10, wherein at least one of the switches can be activated and deactivated by a control device, in order to selectively interact with control elements of grippers that are conveyed past.

14. The conveying installation according to claim 10, wherein the circulating path comprises at least one spiral-running treatment section.

* * * * *